United States Patent
Mead

(10) Patent No.: US 6,878,025 B2
(45) Date of Patent: Apr. 12, 2005

(54) SHAPE-ADJUSTABLE MOLD, SKIN AND INTERIOR-CORE STRUCTURES FOR CUSTOM BOARD PRODUCTION

(76) Inventor: Kirby J. Mead, 8335 South Catalina Ave., Whittier, CA (US) 90602

( * ) Notice: Subject to any disclaimer, the term of this patent is extended or adjusted under 35 U.S.C. 154(b) by 0 days.

(21) Appl. No.: 10/436,686

(22) Filed: May 12, 2003

(65) Prior Publication Data

US 2004/0043680 A1 Mar. 4, 2004

Related U.S. Application Data

(63) Continuation-in-part of application No. 09/743,760, filed on Jan. 12, 2001, now Pat. No. 6,623,323.
(60) Provisional application No. 60/176,136, filed on Jan. 14, 2000.

(51) Int. Cl.[7] .............................................. B63B 35/79
(52) U.S. Cl. ........................................ 441/74; 114/357
(58) Field of Search ............................ 114/357; 441/74

(56) References Cited

U.S. PATENT DOCUMENTS

| | | | | |
|---|---|---|---|---|
| 3,802,010 A | * | 4/1974 | Smith .......................... | 441/74 |
| 4,255,221 A | * | 3/1981 | Young .......................... | 156/382 |
| 4,964,825 A | * | 10/1990 | Paccoret et al. .............. | 441/74 |
| 5,094,607 A | * | 3/1992 | Masters ....................... | 425/429 |
| 6,561,118 B2 | * | 5/2003 | Mead ........................... | 114/357 |
| 6,623,323 B1 | * | 9/2003 | Mead ........................... | 441/74 |

* cited by examiner

Primary Examiner—Stephen Avila
(74) Attorney, Agent, or Firm—Michael J. Hughes; Intellectual Property Law Offices

(57) ABSTRACT

Discloses skin and interior core structures made shape-adjustable with a layer of skin core forming a pre-molded perimeter rail; exterior structural skin can be molded using a convex shape-defining mold to produce a plurality of different shapes; separate subparts give the mold the capacity to describe different curves and modify different parameters of the board's design. Mold is reversible; male/female configurations produce convex shape-defining substrates allowing a wide array of different shapes. Board is fabricated without use of any concave shape-defining surface, and therefore without the high manufacturing costs and structural problems of prior art female molds.

24 Claims, 11 Drawing Sheets

SHAPE-ADJUSTABLE MOLD, SKIN AND INTERIOR-CORE STRUCTURES FOR CUSTOM BOARD PRODUCTION

RELATED APPLICATION

This application is a continuation-in-part of application Ser. No. 09/743,760 filed Jan. 12, 2001, now U.S. Pat. No. 6,623,323 issued Sep. 23, 2003, which claims priority from U.S. provisional application No. 60/176,136 filed Jan. 14, 2000.

BACKGROUND OF THE INVENTION

1. Field of the Invention

This invention relates to methods and apparatus used in the design and manufacture of surfboards, sailboards or similar aquatic boards, referred to generically herein as "board" or "boards."

2. Description of the Related Art

Surfboards and sailboards are similar in shape and basic structure—the board typically has a high strength exterior skin covering that protects and is supported by very low-density material in the interior core; in construction, moldable plastic is used for the compound curvatures and sharp trailing edge contours conducive to a low-drag hydrodynamic shape; the board's primary strength is derived a woven fabric, made from high-strength glass, carbon or aramid fiber, that is imbedded in the plastic to form a fiber-reinforced plastic or plastic composite skin.

The composite skin, which is very thin, can be reinforced with specially manufactured high-density PVC sheet foam, end-grain balsa or honeycomb core materials to form a "structural sandwich" or "cored composite." The stiff, lightweight core material, used as a substrate to separate the high-strength composite layers on either side, creates a fundamentally different structure—the sandwiched core delivers the stiffness and rigidity of much thicker material, but at a fraction of the weight, and provides the impact resistance and compressive strength the very thin layers of plastic composite lack.

The composite core materials and reinforcing fabrics impart a high degree of stiffness and very high strength but, unlike the weaker plastics and foamed plastics with which they are combined, have a limited capacity to conform to compound curvature (i.e., a surface that curves in two directions at once). Where the curvature is severe, divisions are necessary to prevent structural defects such as wrinkles in the reinforcing fabric, or the breakage and/or failure of the core material to conform to the required shape. Since a break in the continuity of either material causes a large reduction in strength, the placement of a division—usually referred as a joint or seam—is critical to the overall structural integrity of the board.

Currently, with molded methods of production, or in custom "one-off" manufacture (i.e., when the board is fabricated by hand) a joint or seam is required to accommodate the sharp curvature at the board's perimeter edge or "rail"—this division creates a number of seemingly unrelated but very serious problems, which increase manufacturing costs and seriously compromise the board's potential strength.

In prior art molded manufacture, for example, the sharp curvature around the board's perimeter edge compounds a number of very basic drawbacks inherent in the mold's concave configuration itself—the resulting structural problems and high manufacturing costs make the mold, and the board structure requiring fabrication in the mold, fundamentally unsuited for board production. The problems begin with the mold's inward turning surface—saturated by hand, the resin naturally tends to flow out of the reinforcing fabric and pools in the concave cavity of the mold; the mold's sharp edge contours then create a dam that makes it very difficult for the squeegee to completely remove the excess—the result is a weak, heavy resin-rich skin. In areas of severe concave curvature, wrinkles in the reinforcing fabric easily occur, and are difficult or impossible to remove—pulling the fabric taut tends to lift it from the surface of the mold; pushing on the fabric is analogous to pushing on a string, and causes wrinkles to (re)appear.

To minimize the above problems, in the prior art the mold is divided into top and bottom halves—with the relatively flat and shallow surface the fabric is easily aligned and much of the excess resin can be successfully removed—the placement of the part-line, however, is in the worst position possible—at the board's exposed perimeter edge. Because the division of the mold also breaks the continuity of the high-strength fiber, the mold-seam on the finished board has only a fraction of the strength of material where the fiber is fully intact. The design of the joint is then compromised by the limitations of the mold's concave surface—the mold-seam is far stronger and reinforcement is much more effective when applied to the interior of the joint, which becomes completely inaccessible once the mold is closed. The mold-seam is typically reinforced after removal from the mold; this adds weight to the already resin-rich skin, and sufficient rework to negate much of the labor-saving advantage.

The difficulty molding the board's interior foam core then raises production costs further still—because the expansion of plastic foam involves heat (e.g., polyurethane foams undergo an exothermic reaction; steam is required to expand EPS "bead" foams) there is both an expansion and a very slight cooling contraction cycle in the foam; the slight cooling contraction makes it very difficult to pre-mold the board's interior foam core to sufficiently tight tolerances to eliminate potential voids between the surface of the foam and the mold—when the expansion occurs in the mold, the cooling begins before the foam has fully hardened, and often causes poor adhesion or an inconsistent skin-to-interior core bond.

To reduce the problem, in the prior art the foam is contained in an extremely strong mold and the very high outward pressure generated by the foam's expansion is used to attain adhesion and an adequate bond. Drawbacks include the high cost of the mold—which typically has steel reinforcing jigs attached and is held in a hydraulic press or by other mechanical means to prevent buckling, separating or failure under the high pressure of the expansion—and the higher density of the foam and added weight.

The additional problem is that the plastic composite is thin and bendable, and the resin generally shrinks between five and six percent as it cures. The direction of shrinkage is primarily into the fiber and against the surface of the mold, where it is held in place by the perfect vacuum that develops as the resin hardens and cures. Because the two halves must eventually meet at a precise point around the perimeter, the function of the mold is to stabilize the laminate, and prevent distortion or shrinkage of the resin from creating a mismatch between the two opposing sides—the skin must then be fully cured and receive the support of additional material (ordinarily provided by the bond between the two opposing sides and the board's interior core) before it can be removed from the mold. The order of application is a major problem: the least stable and longest curing material (i.e., the composite skin) is applied to the mold first, quickly curing foams or pre-molded interior core structures are added later—this lengthens the mold-cycle and causes very slow production.

a. Molded Methods of Production

With excess weight, high-capital costs, and lack of any competitive advantage in terms of price, the only manufacture of molded fiberglass skin/polyurethane foam core surfboards occurred in the early nineteen-sixties, soon after the introduction of polyurethane foam, and were derisively referred to as "pop-outs" due to their structural inferiority. The commercial production of molded hollow boards was attempted in the early nineteen seventies, but was also very brief—absent the foam, the lack of an effective joint between the board's top and bottom sides (see, e.g., U.S. Pat. No. 3,514,798 to Ellis) caused the mold-seam at the perimeter to split open with relatively modest impact; with higher impact often detaching the skin from the interior support structure, the damage was difficult or impossible to repair.

Reviewing prior art clearly shows the structural defects and compromises caused by the concave configuration of prior art female molds. U.S. Pat. No. 3,802,010 to Smith, for example, suggests that the mold-seam at the board's perimeter can be eliminated by dividing a conventional female mold into right and left halves, and laying the saturated fiberglass fabric into the mold in a single sheet. According to the invention, the centerline division means that there are no joints along either side or rail where the board is subject to the greatest beating during use.

What is completely ignored is the fact that the board's outline around the perimeter is roughly twenty percent longer than the straight line along the axis of symmetry—if the part-line is placed at the shortest distance between the nose and tail of the board, the fiberglass must elongate a total of ten percent per side to cover the perimeter of the mold, while maintaining its original length at the center. Since fiberglass is not elastic, ten percent of the fabric will be excess, and will appear as folds and wrinkles in direct proportion to the differential in length.

The sharp folds in the reinforcing fabric create voids if subsequent layers are applied on top—this precludes the possibility of adding fiberglass layers or the use of any composite core material at all, or using these materials to create a bonding/reinforcing flange between the two opposing sides. The joint is formed by pouring a very thick layer of adhesive into a concave depression in the foam core, creating a very weak and heavy mold-seam between the opposing sides. The mold's deep internal cavity and lack of access makes it impossible to accurately trim and create an overlapping joint in the fabric at the perimeter of the mold, and also prevents the defects from being properly repaired. The invention suggests trading the well-known structural problems caused by the relatively shallow concave cavity of the conventional female mold, for the much larger defects of a very deep one.

The closely related U.S. Pat. No. 4,383,955 to Rubio et al. specifically identifies a number of the more obvious problems outlined above, and teaches a conventional solution: to improve access, the right- and left-hand mold configuration to Smith is given an extra division that turns it into quarters—with the four relatively flat mold surfaces, the fiberglass fabric can be successfully applied to the mold without wrinkles, moreover, with the accessible mold surface ordinary steps such as polishing, prepping and applying release agents to the mold become possible so that the board can subsequently be removed. From a structural or fabrication standpoint, however, there is no improvement at all—the extra division adds a mold-seam at the perimeter rail, and neither disclosure addresses any of the well-known problems involved in molding the board's interior foam core.

In both inventions, the mold is used as a container and the liquid prefoam is poured into the mold cavity and allowed to rise parallel to the board's width—the foaming reaction of the polyurethane resin is deceptively simple, however; when complete, even the mixing cup appears to make a perfectly acceptable mold. The problem is that the foam's upward movement during expansion occurs before the resin begins to harden—the movement destroys the cellular structure of the foam against the interior surface of the board's fiberglass skin and concentrates the released blowing agent or gas in the same area, and leaves large areas of the fiberglass skin with a very thin, nearly continuous void directly beneath the surface, and little or no skin-to-interior core bond.

In the disclosure to Rubio, et al. the voids are identified, but the inventors incorrectly attribute the soft spots [i.e., the voids beneath the skin] to the expansion and contraction cycle of the foam (the soft spots are described as areas where the foam has pulled away from the resin in the fiberglass skin). They therefore suggest using a baffle to contain the expansion of the foam to force it against the interior surface of the skin—a partial step towards the prior art method of containing the foam in a high-strength mold and hydraulic press. Neither invention has seen production, since prior art problems of molding the board's interior foam core, the length of the mold-cycle, and the weak or inadequate joint between the board's two opposing sides are neither noted nor addressed. In known methods of sailboard production, the latter two problems are "solved" by eliminating the reinforcing fiber or foaming the resin matrix in the skin, and therefore entail a major reduction in strength.

In low-cost methods of sailboard production, for example, blow-molding or rotationally molding techniques are used to blow or melt a thermoplastic resin to the surface of the mold; this produces a continuous one-piece skin, but relegates production to beginner and entry-level sailboards due to the excess weight/inadequate strength caused by the lack of any composite material at all. The added drawback is that the interior foam core must be formed by injecting liquid pre-foam into the interior cavity of the closed mold, which involves the production problems outlined above.

Pre-molding the board's interior foam core is a very widely used alternative since it allows a major reduction in weight—the problem, as noted above, is the difficulty in consistently pre-molding the foam to tight tolerances (e.g., within several thousandths of an inch). In the prior art, the lack of close tolerances is compensated for by saturating the reinforcing fabric with an epoxy resin that has a blowing agent added; with the laminate/interior core assembly contained in a heated mold and a mechanical press, the epoxy expands to fill any voids or discrepancies between the pre-molded interior foam core and the closed cavity of the mold. With the added stiffness of a PVC sheet foam layer sandwiched between layers of foamed laminate in the skin, the board is light in weight and the quickly-curing foamed resin and rapid mold-cycle makes production costs competitive with hand methods of surfboard or sailboard production (outlined in more detail below).

An illustration of the low production costs using the method is provided by the U.S. Pat. No. 4,713,032 to Frank, the specification of which is incorporated herein, in which the prior art foamed epoxy laminate—often referred to as a "thermal compression-set epoxy" due to the high pressure and temperature cure—is replaced with a quickly-setting, foamed polyurethane resin for a very rapid mold-cycle of about twenty minutes per board, and high production from the molding tool of as many as twenty-four boards per day.

Using either resin, the pressurized cure limits the shape of the board an exact duplicate, while the foamed laminate replaces high-strength structural layers in the skin—this leaves strength-to-weight and skin-to-interior core ratios well below expensive high-performance sailboards, which eliminate the blowing agent in the resin matrix to create a much higher strength "structural sandwich" or "cored composite" skin.

b. Structural Sandwich/ "Advanced Composite" Production

The structural sandwich is expensive to fabricate because of the lengthy mold-cycle—vacuum pressure is used to conform the skin core to the shape of the mold, and removes entrapped air and voids in the composite skin; to prevent any spring-back of the skin core the material remains in the mold under vacuum pressure for about two to three hours until the resin has completely cured. Adding to production problems caused by the lengthy cure is the difficulty removing excess resin from the skin—the mold's sharp, upraised edge contours tend to create a dam, and the addition of the sheet core layer creates a buffer that blunts the squeegee pressure on the interior layers of laminate against the surface of the mold; the vacuum-bagging procedure requires an airtight mold and seals the entire skin, and prevents any excess resin from escaping during cure. In addition, the stiffness of the skin core generally exceeds the pressure available with vacuum (14.7 psi) and prevents it from being conformed to the very sharp curvature at the board's perimeter rail; the sharp curvature at the rail compromises the design of the joint and, due to the excess resin, the strength of the entire board as well.

The U.S. Pat. No. 4,964,825 to Paccoret, et al. illustrates the problems outlined above; it reveals a large gap in the sandwich structure and very poor joint design at the board's perimeter edge (a conventional inward-turning bonding flange is depicted)—the mold's sharp edge contours, the sharply inward curving bonding flange, and the complete seal of the vacuum-bag prevents any of the excess resin from escaping prior to cure. The invention is directed to improving the structural design of the board in the fin-box/mast track areas; the design of the mold-seam and the removal of excess resin are much larger problems, but neither is addressed.

The U.S. Pat. No. 5,023,042 to Efferding also reveals very poor joint design; complications in this case are due to the difficulty of laminating the sandwich skin to a very low-density, pre-molded EPS (expanded polystyrene) "bead" foam interior foam core. In the disclosure, the PVC sheet foam/wet epoxy laminate fits into molded-in recesses in the EPS interior foam core and the entire assembly is placed in the mold—the exterior surface of which precludes resin removal by hand. Vacuum pressure is used to press the components tightly together but exceeds the compressive strength of the foam, causing it to distort and crush, and also withdraws air trapped between the individual beads of foam—the "outgassing" of air from the foam results in pockets of entrapped air and large voids in the composite laminate.

To prevent these problems, Efferding suggests using a vacuum bore to withdraw air from the foam and discloses a novel female mold with a flexible perimeter portion that, under full vacuum, bulges outward evenly and allows the EPS interior core to assume an even, permanent compression set during cure. Structural compromises include the large gap in the sandwich skin structure at the board's perimeter rail, and the absence of internal spars, shear webs, or hollow, weight-reducing areas in the board's interior core—all of which would create distortion problems and/or prevent the board from compressing evenly during cure. The added problem is the high resin content in the skin—to draw vacuum the mold completely encases and seals the board structure and prevents excess resin from escaping during cure. A low temperature oven is also used to speed production, but costs are still very high due to the lengthy mold-cycle of just under three hours.

The inventor notes that known methods of sailboard production produce boards having a mold-seam at the point of greatest breadth thereof; the word "seamless" in the title of the invention refers to the modest improvement in the placement of the mold-seam—which is not in the expected location, but on the sharpest point of the rail.

Borrowing directly from the general mold configuration disclosed by Efferding, the U.S. Pat. No. 5,266,249 to Grimes III, et al., the specification of which is incorporated herein, teaches a method of forming interior joints in at least partially enclosed confined interior areas (see, e.g., the mold configuration to Smith) and an improved joint design as well—the composite layers meet and form an overlapping joint at the perimeter rail. The drawbacks are again caused by the mold's concave surface—fabrication of the joint requires a female mold and extremely costly "advanced composite" material; the tackiness of the partially cured "pre-preg" epoxy laminate is used to adhere the deck or top layers of the honeycomb core material to the walls of the mold; the bottom layers of board are then assembled on an inflated bag, which doubles as a vacuum bag and provides the very high outward pressure (i.e., at least 13 psi) needed to hold the composite skin/honeycomb core material in proper orientation and in pressurized contact with the mold prior to and throughout the cure.

According to the invention, there had previously been no method of applying fiber-reinforced plastic to the interior sides of mold-seams or joints; the inflated bag provides a very ineffective means for doing so, however, since its assembly adds considerable labor and limits the interior structure to a single support wall, rather than the higher strength and much lighter weight afforded by a plurality of internal shear webs or supporting struts. Further, neither surface (i.e., the inflated bag or the mold) provides the stability or the reference point required for the honeycomb core material to be accurately trimmed and glue—depoxy pre-preg core splice strips (strips of thermosetting epoxy that foam during the high-temp cure)—which must be held against the concave mold surface by the vacuum bag during cure—are therefore required to fill the gaps or voids around the perimeter rail where the honeycomb core cannot be accurately fit.

Although an obvious improvement over the prior art, the placement of the joint is at the sharpest point on the board's perimeter rail, and its design is less than ideal—the joint's shear and impact strength is reduced by the break in the fiber and the honeycomb core, causing earlier skin detachment and/or failure of the joint at lower levels of impact. Much greater impact resistance can be had by eliminating the joint itself: complete continuity of the core material would allow the continuity of the high-strength reinforcing fiber to be maintained throughout the perimeter edge, and reinforcement could also be confined to the interior side; much higher impact strength could also be had by increasing the density of the core material throughout the entire exposed perimeter rail area itself.

More importantly, the configuration of the mold makes it impossible to move the primary division between the two halves to the axis of symmetry; combining the joint with the support wall would create a far stronger board structure, since the support wall would provide internal reinforcement and an entire backup structure as well, in an area that is flat and only rarely exposed to high-point and impact loads.

As in the invention to Efferding, the mold completely encases and seals the board structure (bolts are depicted) and prevents any excess resin from escaping during cure; as noted above, an optimum fiber/resin ratio in the composite is extremely important—because the strength of the reinforcing fiber is usually several orders of magnitude higher than the resin (e.g., in a fiberglass composite, the tensile strength of glass, at roughly 500,00 psi, is roughly fifty times that of the resin, at 9–12,000 psi), excess resin in the composite typically causes a large reduction in strength. In sandwich skin fabrication, reducing the percentage of resin from the sixty to seventy percent range (by weight, and typical when the reinforcing fabric is saturated by hand) to the thirty-five percent level will usually double the compressive and flexural strength of the composite facing in bending—equally important, the weight saved can be used to increase the density of the stiff, lightweight sandwiched core; because the improvement in strength that comes by increasing the density of the core is not linear—i.e., doubling the core material's density will usually triple its compressive strength—an optimum fiber/resin ratio in the laminate can more than double the flexural, compressive and impact strength of the structural sandwich skin as a whole.

Reducing the resin content, however, requires special unidirectional fabrics or very tightly woven, difficult to saturate "crow-foot" or "satin" weaves of cloth, as well as a method for applying fairly high pressure to physically force the resin from the fiber, a lack of obstructions to allow the resin to actually be removed, and a barrier (e.g., a thin plastic film) to prevent air from re-entering the laminate (due to the slight spring-back of the fiber) once the pressure has passed. With current methods of production, efforts to employ these techniques have been less than completely successful due to the stiffness of the core, and the shape of the board and/or mold, as outlined above—Paccoret et al. and Grimes III et al. therefore teach the use of extremely expensive "pre-preg" or "advanced composite" material to keep the resin content to an absolute minimum.

As the name suggests, in the "pre-preg" the reinforcing fabric is pre-impregnated with the precise amount of epoxy resin (by Hexcel, Ciba-Geigy etc.), the resin is then "B-staged" or partially cured, the material is shipped under refrigeration to the end-user (usually large airframe manufacturers such as Boeing etc.), the material is then placed in the mold and undergoes a high-temperature, high-pressure autoclave cure. Due to the prohibitively high material cost, the lengthy two to three hour mold-cycle (½ hr. to heat, 1–1½ hr. cure, ½ hr. to cool) and the high-temp, pressurized cure, the "advanced composite" or pre-preg laminate/ honeycomb skin boards occupy only a small niche in the overall sailboard market.

The further drawback is that the generally hollow board structure is best used on very thick sailboards—where the higher overall volume of the interior foam core adds a great deal of weight but little strength—and a foam core offers lighter weight with thinner, high-performance wave-boards (sailboards) and surfboards. The molds and methods outlined above, however, are not interchangeable—the high-temperature and pressurized autoclave cure needed for the honeycomb core/pre-preg laminate (e.g., 250° F. and a minimum pressure of 13 psi) typically exceeds the compressive strength of very low-density foams, and will melt polystyrene based foams (specified by Efferding, for example); specially designed molds are also required for the mechanical/hydraulic press involved in attaining adequate adhesion using liquid resin pre-foams, whether the material is used as a fiber-reinforced foamed laminate in the skin (e.g., the invention to Frank) or as the board's interior foam core. Hence, in the prior art, the configuration of the board and the materials used in construction are not readily optimized to the design of the board or performance requirements of the rider; compounding the problem, the mold's concave, female surface defines the board's exterior shape and restricts production to a series of exact duplicates.

Because of the very light weight and lower production costs possible when the board is fabricated by hand, molded surfboard production has been virtually nil since the beginning of the "modern era," which began with the introduction of moldable plastic foam and fiberglass-reinforced plastic over four and five decades ago respectively, while custom "one-off" sailboards comprise a very significant portion of the overall market—particularly in high performance area such as Hawaii. In surfboard and high-performance sailboard production, the wide range of size and shape requires a large and prohibitively expensive inventory of molds, and eliminates the many custom design modifications that are now made as a matter of routine—the concave configuration of prior art female molds prevents the board's width, planing area and lengthwise "rocker" curvature from being tailored to the size of the waves or the individualized requirements of the rider.

C. Custom or "One-Off" Board Production

In custom or "one-off" (surf)board production, the board is individually hand-shaped from a polyurethane foam "blank;" the fiberglass and resin are then applied by hand over the shaped foam core. The process is labor-intensive and requires considerable skill, but the problems of molded manufacture are limited to a pre-production phase—the board's interior foam core is first molded by a separate manufacturer into a rough surfboard-shaped slab of foam, before being shipped to the surfboard manufacturer to be used in the actual construction.

To enhance strength and better control the somewhat unreliable reaction of the low-density polyurethane foam, the blank is molded in an extremely strong, heavy mold made of reinforced concrete. This allows an excess of liquid pre-foam to be poured in the mold; as the foam expands, the excess compresses under high pressure against the surface of the mold and produces a density-gradient in the blank—the foam is soft and weak in the center and becomes progressively harder and denser towards the surface. To avoid removing too much of the harder, denser surface foam during shaping, the blank is molded close-to-shape, or as thin as possible. The close-to-shape molding increases the already very large number of blank molds required for surfboard production, and frequently leaves the shaper with insufficient foam for the proper thickness or the required lengthwise bottom curvature or "rocker" on the board.

The molded-in rocker of the blank must therefore modified by the blank manufacturer—the blank is cut in half lengthwise, and the two halves are glued to a wooden center spar or "stringer" cut to the rocker curvature specified by the customer, and usually selected from a list of stock lengthwise rocker modifications. Clark Foam of Laguna Niguel, Calif., (www.clarkfoam.com) provides a Rocker Catalog listing the dimensions of over two thousand different templates available to modify the molded-in rocker curvature of the more than sixty different blank molds offered for surfboard production. With shipping and inventory problems at both ends of production, manufacture of the blank is expensive, but essential, since it allows the board to be tailored to the according to the flotation, planing area, and performance requirements of the rider.

After shaping, the fiberglass laminate is applied directly to the shaped foam, which provides a smoothly curving convex surface. With a fiber-reinforced composite, a convex substrate provides the foundation for a stronger, lighter structure—excess resin is easily removed for higher strength and lighter weight, and joint creation is stronger and simplified—the fabric can be pulled taut and a double overlapping joint created to provide a protective covering for the very exposed perimeter edge or "rail" and the very sharp convex curvature at the nose and tail as well.

The drawbacks include the large amount of labor and extra coats of resin required to sand the overlapped area completely smooth, and the board's very light weight—for higher performance, overall board weight has been consistently reduced to the point where the low-density interior foam core is no longer strong enough to fully support the board's thin exterior skin. The single fiberglass ply used on the bottom of the board will usually dent or fracture with moderate finger/thumbnail pressure, while the double or triple layer on the deck (or top surface of the board) that reinforces the tail area where the rider stands often fatigues, becomes permeable to water, then fails and completely delaminates under the repeated high pressure of the rider turning the board. Hand-shaping also limits the effectiveness of the longitudinal reinforcement—it makes wood the material of choice for the center spar and also makes it impractical to add top and bottom spar caps (i.e. the top and bottom reinforcing flanges in an I-beam)—the lack of effective longitudinal reinforcement leaves thinner surfboards in particular susceptible to breakage.

With current methods of production, the strength of the "one-off" or custom board is severely compromised by the roughly one-to-one weight ratio between the fiberglass skin and interior foam core—efforts to alter this ratio have been largely unsuccessful. The U.S. Pat. No. 5,569,420 to Van Horne, for example, suggests increasing the density of the polyurethane foam core—this is done by laying out sequential lines of liquid pre-foam that expand and, with the exposure to air slowing the reaction of the foam, leaves the foam with a hardened arcuate shell on its exterior surface; the procedure is repeated until a billet is formed; the foam for the board's interior foam core is then cut from the billet and hand-shaped the final dimensions. The procedure increases the overall density of the foam, but eliminates one of the primary advantages of the one-off method of production, which is the extremely rapid mold-cycle in the molding, of the blank (e.g., in the invention to Frank, a reaction retarder is needed to extend the rapid five minute setting time of the polyurethane resin in the foamed, fiber-reinforced plastic skin).

The U.S. Pat. No. 4,255,221 to Young teaches a laminated plywood skin created from individual layers of veneer, which are conformed to the curvature of a hand-shaped interior foam core using vacuum pressure. To reduce weight, Young provides additional adjustable means outside the vacuum forming apparatus to squeeze excess epoxy from the layers and to aid in conforming the wood to the hand-shaped interior foam core. The difficulty is in forming an effective joint at the perimeter rail—since the veneer can break if the curvature is severe, the edge contours of the board are made by laminating strips of wood directly to the interior foam core; after curing, the strips are hand-planed to the final dimensions and form a solid laminated wood perimeter rail.

In the disclosure to Efferding (discussed in greater detail above), the inventor describes developing a similar vacuum-bagging method for fabricating a sandwich skin sailboard. The use of composite material greatly complicates the process, however—for example, no attempt is made to conform the high-density PVC sheet foam to the sharp curvature at the perimeter rail, since it will break well before it reaches a right angled bend; in areas of very sharp curvature, its stiffness typically exceeds the pressure available with vacuum (i.e, 14.7 psi) and the compressive strength of the low-density EPS interior foam core as well. The further problem is the lack of any reference point along the board's perimeter edge—because of the difficulty trimming the composite core material and the gap or mismatch between the board's two opposing sides, the inventor teaches that the core material should fit into recesses in the interior foam core. Efferding reports that it takes between thirty to forty five hours to manufacture an acceptable sailboard using the technique; to reduce labor, Efferding discloses and teaches the use of a novel female mold.

In "one-off" or custom production, the board's barely adequate level of strength is due to the lack of a strong, composite based skin structure that can be fabricated using a convex surface such as plastic foam; in molded manufacture; the high production costs can be traced to the fact that the stiff, lightweight composite core materials and reinforcing fabrics are not suited to being fabricated in the concave cavity of a mold at all, particularly when the inward turning surface performs a shape-defining function, as is the case with prior art female molds. With either method, the primary problem is the inability to conform the stiff, lightweight composite core materials and reinforcing fabrics to the sharp compound curvature at the board's perimeter edge and rail.

SUMMARY OF THE INVENTION

In an embodiment of this invention, the board's structural exterior skin comprises a layer of skin core that is pre-molded to form a perimeter rail that connects the broad, generally planar top and bottom surfaces of the board; the skin encompasses foam, partially hollow chambered foam, or a plurality of internal shear webs or supporting struts; a high-strength bonding/reinforcing flange joins the board's two opposing sides. The present invention discloses shape-adjustable composite-based skin and interior core structures that can be quickly fabricated without any concave shape-defining surface at all, and therefore without the high initial costs of constructing a prior art female mold, and the high manufacturing costs and structural problems caused by its use. The novel skin structure can be fabricated using a convex surface and the bonding/reinforcing flange provides a convex surface joining the two opposing sides.

The board's high strength and very low production costs are due to an inexpensive pre-forming step, in which the configuration of the mold and fabrication method are specifically adapted to conform a layer of skin core to the severe compound curvature around the board's perimeter edge or "rail" (the term denotes the edge contours on either side of the point of greatest breadth necessary for a hand-held grip, and includes at least a portion of the board's generally flat bottom). With the high degree of compound curvature, the preformed perimeter rail provides a very stiff and stable substrate; the composite facing material can be applied to the skin core, rather than to the mold—the skin core then functions as a mold and defines the shape of the composite laminate as it hardens and cures.

The pre-formed rail fundamentally changes the production process and the nature of the mold itself: a rigid convex shape-defining mold can be used in the pre-forming step and, with the shape of the board pre-defined, a second very thin, inexpensive (and optional) layer of material can be used to impart a smooth surface in the exterior skin. By dedicating male and female surfaces of the mold to separate functions, each becomes much less expensive to construct, and the production steps can be ordered to dramatically increase the productivity of both; both the mold and board structure are easily altered in shape, and the board's structural configuration can be optimized for much higher strength and lighter weight.

With its relatively small area, the density of the skin core of the perimeter rail can be several times higher than the surrounding bottom surfaces and deck; because the improvement in strength is not linear—e.g., doubling the density of high-density plastic foam, for example, will usually triple its compressive strength—the board can have very high impact resistance around the exposed perimeter edge, and lighter weight/higher strength, less conformable core materials such as end-grain balsa and honeycomb core (the cells of which are prone to rupture) can be used for the board's bottom and the less exposed surface of the deck. For very rapid production, the skin core can be molded in right and left halves—a convex mold allows the pre-forming step to be designed to thermoform a continuous monocoque shell from a single thermoplastic sheet; a plurality of skin core layers can also be formed to create a density gradient from the outermost surface of the board inward.

Structurally, the convex mold/shape-defining surface provides a base to create a bonding/reinforcing flange with a high-strength convex joining surface between the board's two opposing sides; either surface (i.e., the convex mold and bonding/reinforcing flange) and also be coated with composite laminate and serve as a tool to provide internal structural reinforcement to the joint and areas prone to high impact where hands, fingers, or application tools will not fit (e.g., the nose, tail and rail). In the present invention, the convex mold/shape-defining surface can be plastic foam and become part of the board structure itself—because it is pre-expanded, it eliminates prior art adhesion problems in the skin-to-interior foam core bond and, being the shape-defining surface, also provides a perfect fit.

In the present invention, both surfaces (i.e., the skin core and convex, shape-defining foam) provide shape-adjustable substrates—formed separately, the perimeter rail can serve as an template to cut deck and bottom skin core panels from sheet core material or partially pre-fabricated sheet core material (e.g., skin core material with high-strength composite laminate fully cured on the interior side); the panels can then be bonded to convex shape-defining foam, a pre-fabricated spar, or other material used in the interior core, with the pre-formed rail completing the perimeter and connecting the top and bottom sides.

The continuous surface of the rail where the board's top and bottom surfaces intersect allows the board's primary division to be moved to the axis of symmetry—the board's width can then be altered along the longitudinal centerline of the board, the tail can be made wider to the nose and vice-versa; the rail also creates a hinge so that the board's thickness and volume can be determined by prefabricated material used for the interior core; in each case, the skin core layer then serves as a substrate for the application of high-strength facing material; with the shape of the board pre-defined, a thin, inexpensive conformable female surface may be used for the smooth finish completing the exterior skin.

The principles and materials outlined above are used interchangeably with the reusable shape-defining mold itself: in the pre-forming step, the skin core will bridge gaps and mask imperfections on the surface of the mold—this allows the shape-defining mold to be divided into separate parts designed to be moved, then fixed and set so as to change dimensions, describe different curves and modify various parameters of the board's design. In the present invention, for example, the bottom panel of the mold may be designed to bend lengthwise to alter the rocker curvature of the board, the deck panel can be made adjustable to control thickness, and a flexible perimeter rail component may be used to modify the board's outline and width; added rail segments and/or adjustable nose and tail components then allow changes in length at either end. Reference for the movement and fixed positioning of the mold parts may be provided an external structure, such as a mold base, which may be placed parallel to the mold's longitudinal axis of symmetry, and/or each other.

When fixed attachment of the shape-defining subparts is to a mold base, the convex exterior or male surface of the mold is used, and the mold thus configured can accommodate virtually all the common modifications required within a particular style of board. Certain design features, however, such as bottom channels, nose concaves etc. can introduce enough compound curvature into the affected mold panel or rail component to reduce its bending capacity and thereby limit its further use; these design features are therefore more economically accommodated by creating a one-off mold out of plastic foam. In an embodiment of the present invention, the convex configuration is reversed and plastic foam is molded in the concave cavity of a shape-defining mold to produce a foam blank that, upon removal, can quickly have the desired features shaped into the foam by hand; the shaped blank then provides the convex mold needed to form the surface layer(s) comprising the board's exterior skin.

The mold system produces a board substrate that can be removed from the shape-defining mold with the severe compound curvature pre-molded around the perimeter edge and the shape of the board substantially pre-defined: a second concave female surface, conformable to the convex surface of the substrate, may be used to impart a smooth surface in the board's exterior skin. This allows the fabrication steps to be ordered for very rapid production—quickly molded plastic foam or thermoplastic material can be used to define the shape of the longer curing, high-strength composite laminate as it hardens and cures.

In an embodiment of this invention, the convex shape-defining surface allows sufficient leverage or pressure (e.g., in excess of vacuum or 14.7 psi) to be applied so as to conform a layer of skin core over the area of sharpest curvature to pre-mold the board's perimeter edge; the exposed convex surface then allows access so the skin core can be accurately trimmed. In preferred embodiments, the skin core is a thermoplastic sheet that is heated to a deformation temperature and conformed to a convex mold—in the form of a reusable mold or shape-defining plastic foam—to reduce the time that the mold is in actual contact with the board to that needed to mold the shape-defining foam or thermoplastic material in the skin (either material can usually be molded or thermoformed in 2½ to 7½ minutes, depending on the type of foam and density of the plastic). The rapid mold-cycle, and the fact that the shape-defining surface can become part of the board structure itself, reduces the high capital costs of the mold to a fraction of the prior art; costs are then reduced further still because, unlike the molded methods of the prior art, the convex surface of the skin core and mold are exposed and accessible in the subsequent steps of production.

With a fiber-reinforced plastic, a convex surface provides the foundation for a stronger lighter structure; in the present invention, this basic advantage is accentuated by the pre-formed perimeter rail, which allows the board to be laminated with its width at right angle to the worktable—with the severe curvature at the perimeter completely exposed, the reinforcing fabric can be quickly pre-saturated in a mechanical fabric impregnator and draped over the convex surface; wrinkles can be smoothed and the fiber aligned simply by pulling the fabric taut; joint creation is stronger and simplified—the fabric can quickly trimmed to create a double overlapping joint and protective covering on either side of the mid-section of the rail and the very sharp convex edge contours in the nose and tail as well (note: in cross-section, the rail is the area that will allow a hand-held grip—lengthwise, the term can refer to the board's entire perimeter, or the perimeter edge distinct from nose and tail areas, which are usually defined as ending 1 foot back from either end). A series of boards can be laminated in rapid assembly-line fashion and the manufacturing area is dramatically reduced.

Equally important, excess resin can be completely removed for higher strength and lighter weight—the thin, plastic film/flexible female surface allows squeegee pressure to pass directly through to the laminate, gravity then removes the rest—unobstructed, the resin quickly runs off the smooth vertical surface and leaves an absolute minimum within the fiber.

Because of the large disparity in strength between the reinforcing fiber and the resin, excess resin in the composite weakens it; the present invention allows the manufacturer to reduce the proportion of the much weaker resin from the sixty to seventy percent range (by weight, and typical of the prior art where the reinforcing fabric is saturated by hand) to the thirty-five percent level; this commonly doubles the flexural and compressive strength of the composite in bending—and the weight saved can be used to increase the density of the stiff, lightweight sandwiched core; because the improvement in strength that comes by increasing the density of the skin core is not linear—e.g., doubling the density of the sheet core material in the skin will usually triple its compressive strength—an optimum fiber/resin ratio in the laminate can more than double the flexural, compressive and impact strength of the structural sandwich skin as a whole— the higher strength of the skin, in turn, allows a reduction in the density of the interior core. The present invention produces an exceptionally high strength-to-weight ratio without resorting to the use of the prohibitively expensive "pre-preg"/advanced composite material of the prior art.

In the present invention, the stability provided by the pre-formed perimeter rail makes it possible for the board to be constructed without the use of any concave shape-defining surface at all—it eliminates the serious structural problems caused by prior art female molds and the high fabrication costs associated with their use: it reduces the mold-cycle, the high capital costs of the mold, and the area required for production to a fraction of the prior art, and allows the production of custom or identically shaped boards as well. The versatility of the convex/concave mold configuration allows the fabrication steps to be tailored according to manufacturing considerations or the structural requirements of the board; the very high strength of the skin will also allow certain foams to be molded directly in the concave cavity of a laminated skin core molded in right and left halves. The structural advantages and manufacturing benefits outlined above will be more fully understood with the context provided by the detailed description of the invention, and upon viewing the drawings, which are presented as non-limiting examples and should in no way be interpreted as limiting the invention, which is defined more fully and accurately in the appended claims.

DETAILED DESCRIPTION OF THE INVENTION

Figure 1A:
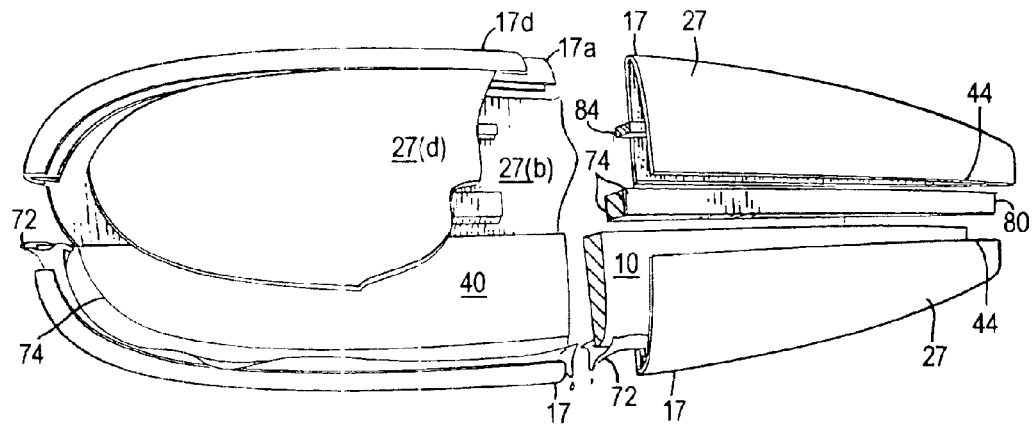
FIG. 1A is a cutaway view depicting the top, or deck surfaces of a board, and the general configuration of shape-adjustable substrates in the exterior skin and interior core.

The present invention discloses shape-adjustable skin and interior core structures that can be fabricated without the use of any concave shape-defining surface at all, and therefore without the high initial costs of constructing a prior art female mold, and the high manufacturing costs and structural problems caused by its subsequent use. As shown in FIG. 1A, the pre-formed perimeter rail 17 provides a continuous substrate that connects the broad, generally planar top and bottom surfaces of the board—molded separately, the perimeter rail 17d can serve as a template to cut the outline curvature in partially prefabricated skin core materials to create deck 27(d) and bottom 27(b) skin core panels which are then bonded to a shape-defining structural core 40; the shape-defining structural core 40, in turn, serves as a tool to apply composite laminate 72 for internal reinforcement in areas of the nose and tail where fingers, hands and application tools generally will not fit. The pre-formed skin core 27 can also be formed into a monocoque shell; the division at an axis of symmetry allows the width and planing area of the board to be adjusted according to where the longitudinal centerline cut 44 is made; the continuous perimeter rail 17 also functions as hinge so that the board's thickness and deck crown (i.e., the transverse curvature) can be modified with an internal shear web 84 and/or a longitudinal spar 80, or be determined by the shape-defining structural core 40, with each of the above surfaces becoming part of the board's interior core. As shown, the convex bonding/reinforcing flange 74 may be placed along the centerline of the board or at the board's perimeter edge or rail. The principles and materials used to modify the shape of the board structure can then be applied to the reusable mold itself.

Figure 1B:
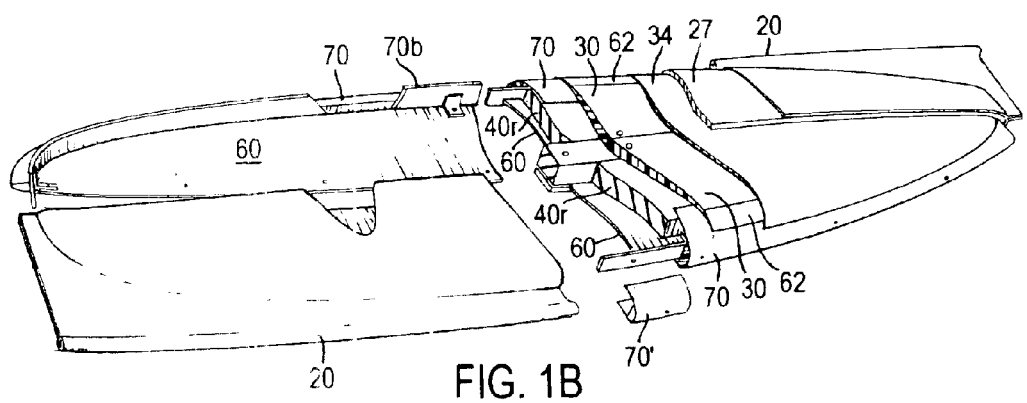
FIG. 1B is a perspective, cutaway view of shape-adjustable, convex/concave mold configurations used to create the substrates of FIG. 1A.

FIG. 1B is a composite view depicting various configurations of a shape-defining mold 10 which can produce the shape-adjustable substrates shown in FIG. 1A. The mold 10 may have an interior core made of impermeable, resilient foam 40r and incorporate an adjustable, interchangeable template 60 to position the perimeter rail 70 and modify the board's outline and width; added rail segments 70' permit changes in length at either end; rocker strips may be designed to attach to the template 60 and to the deck 30 and rocker panels (not shown) to change the lengthwise bottom curvature of the mold 10 and can be used interchangeably with a prefabricated spar 80 (of FIG. 1A); thickness changes may be accomplished using male spacers 34 of molded rubber or synthetic plastic foam (depicted in this view directly beneath the molded skin core 27 and the female component 20). Either surface (27, 20), or a layer of molded silicone rubber (not shown), may be used as (male) spacer(s) to mold a thermoplastic material or conventional fiber-reinforced tooling plastics to create a female mold 20, which can be used to mold plastic foam or to impart a smooth surface in the board's exterior skin; the mold 20 is depicted in this view incorporates a molded hinge along one perimeter edge which will allow attachment to a mold base 12 (depicted in FIG. 2B below) in order to mold a foam shape-defining mold or structural core 10/40; the circular, hollow shape of the hinge also allows a source of vacuum to be applied and permits the entry and removal of resin the laminating process.

The principles outlined above are completely interchangeable between the mold and the board structure itself; board production however, commonly starts with the construction of a mold. The following discussion therefore begins with a general description of the mold's construction, basic configuration and design, followed by an outline of novel shape-adjustable thermoplastic skin structures and molds, and concludes with a general description of methods and materials useful to complete the board.

For purposes of clarity, the drawings typically illustrate only one half of the symmetrical board/mold; the deck or top surface is facing the viewer and the nose is oriented to the left. Composite views are also shown, and depict various skin and interior core combinations. The reference numeral 10 denotes the shape-defining surfaces and individual shape-defining subparts as a whole; like reference numerals are used to denote both right, left, male and female mold subparts; the numbering does not necessarily indicate the dual nature of the part in performing a shape-defining surface or in the board structure itself.

1. Construction of the Mold

In the present invention, a rigid shape-defining component is used to define the exterior shape of the board; after the exterior shape of the board is pre-defined, an optional conformable female component may be used to impart a smooth surface the board's exterior skin. Construction of the shape-defining mold may be from any of the fiber-reinforced tooling plastics, and may also include materials such as metal, plaster, rubber, foam rubber etc. useful in the mold-making arts; the mold may further include synthetic plastic foam which becomes part of the board structure itself. The shape-defining component may be made from solid material; it may have a single division with functional convex (male) and concave (female) surfaces; it can have a single surface or comprise a plurality of individual surfaces, subparts or pieces.

Construction of fiber-reinforced, high-heat compatible tooling epoxy composite allows the fiber to be aligned to better accommodate an anticipated modified curvature or bend, and facilitates the incorporation of different materials into the structure of the mold—for example, metal may be added to increase heat transfer, stiffen specific areas, and reinforce apertures for fastening devices, etc. The tooling composite may also used with an elastomeric acrylic or silicone based rubber for a variety of purposes, including the creation of tapered, flexible fairings between individual moveable mold surfaces or subparts.

The shape-defining component may be used with a separate conformable female mold component that, when used primarily to impart a smooth surface in the board's exterior skin, may be formed from thin, inexpensive sheets of ABS (acrylonitrile-butadiene-styrene), PC (polycarbonate), PP (polypropylene) PMMA (polymethylmethacrylate), etc. using vacuum-thermoforming techniques and, when appropriate, subsequently trimmed in the same manner as the thermoplastic foam skin material of the board described in greater detail below. The female component may also be constructed of flexible, elastomeric silicone or acrylic rubber to allow it to conform to a variety of shapes; fiberglass may be used to create a silicone/fiberglass composite; the mold may incorporate a thin layer of plastic tooling composite to stiffen the broad, planar top and bottom surfaces of the mold, while leaving the elongation of pure rubber at the rail to conform to the convex radius at the board's perimeter edge.

The female surface may also perform a shape-defining function—either in the molding of plastic foam or in the positioning of skin material as the composite laminate hardens and cures. Because either surface can quickly produce a convex substrate (e.g., expanded plastic foam, or sheet material that serve as layer(s) in the skin), and the substrate can be used either as a shape-defining mold or to define the shape of fiber-reinforced plastic as it hardens and cures, male or female molds can be used to produce the board from start to finish.

2. Basic Mold Configurations and Design

Figure 2A:
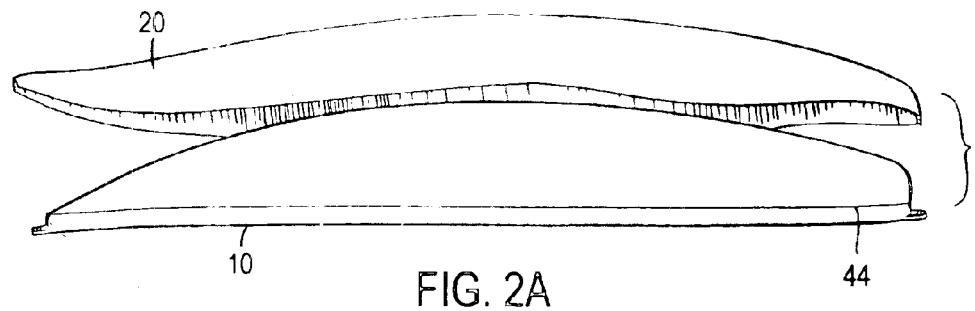
FIG. 2A is a side view of a right-hand mold half, according to an embodiment of this invention.

When the reproduction of a popular stock board shape is a primary consideration, the mold may be constructed as shown in FIG. 2A, which gives a side view of the two basic components of one right-hand mold half. As depicted, the width of the shape-defining component 10 is oriented vertically, the top and bottom sides are normal to a worktable (not shown); the thin, flexible female component 20 is shown being fitted over the shape-defining mold 10; the scribed line 44 represents a hypothetical longitudinal centerline of a molded skin core 27 (not shown in this view) of a right-hand board half. As depicted, the shape-defining component 10 may be solid; each half may also have a single continuous surface with functional interior (female) and exterior (male) surfaces. The mold halves do not meet precisely at a predetermined point—this makes the mold much less expensive to construct, and also allows substantial alteration in shape. The board's width and planing area, for example, can be adjusted according to where the centerline cut 44 is made, the tail can be made wider relative to the nose and vice-versa; the exterior surface can be adapted to incorporate inexpensive subparts (not shown) made from elastomeric rubber or sheet foam to produce nose concaves, bottom concaves or channels; the volume can be modified depending on whether the interior or the exterior of the shape-defining mold 10 is used as the shape-determining surface (during cure); precise gradations may be made by bonding the molded exterior skin core 27 to the shape and longitudinal profile provided by material used in the board's interior core. In the present invention, a mold made for a single, popular stock shape can produce the width, volume and planing area modifications needed to tailor the board to a wide range of individual flotation and performance requirements.

Turning now to FIG. 2A, the right-hand half of a shape-defining mold 10 is depicted with separate shape-defining mold subparts assembled to a mold base 12; during assembly, fixed attachment to the mold base 12 allows the length, rocker curvature and thickness of the shape-defining mold 10 to be adjusted as the separate shape-defining subparts are attached.

Figure 2B:
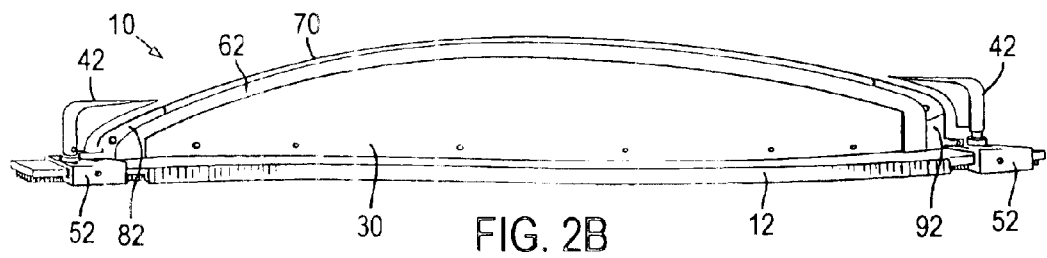
FIG. 2B depicts a right-hand mold half comprising individual, shape-adjustable mold subparts assembled to a mold base.

FIG. 2B is an exploded view of the mold of FIG. 2A, and depicts the basic individual subparts; as illustrated, the perimeter rail part 70 is directly above the bottom rocker panel 50; opposite the rocker panel 50 is the deck panel 30; both are shown at right angles to a mold base 12 that, in this example, provides an external reference and surface that allows the curvature of the rocker panel 50, and/or the other sub-parts to be adjusted as they are attached. In the present example, the deck 30 and rocker 50 rocker panels have a complement of transverse (wherein transverse is normal to a longitudinal axis of symmetry of the mold) stiffeners 48 on the respective interior panel sides (30, 50), visible in this view only on the rocker panel 50.

The deck 30 and rocker 50 panels may be attached by bolts or similar fastening devices to the base of the transverse stiffeners 48; the base area of the transverse stiffeners 48 may be provided with an adjustment mechanism that controls the distance of the deck 30 and rocker 50 panels from each other, thereby allowing the thickness of the eventual board to be measured as it is set. In this example, the upper part of the transverse stiffeners 48 have sliding rods 24 that attach directly to the fiberglass rod 16 on the inside of the perimeter rail 70 to allow movement and the fixed setting of the position of the rail 70 to modify the board's outline and width. In this example, the structural skeleton of the perimeter rail 70 comprises an articulated rib/backbone arrangement made of molded tooling epoxy composite. The ribs, created by razor cut through the laminate before the resin has fully set, are imbedded in molded rubber for a smooth surface skin and attach to a molded fiberglass or carbon-fiber rod 16 that functions as a backbone; the skeletal structure allows the perimeter rail 70 to flex lengthwise with different rocker curvatures of the rocker panel 50, expand and contract to incorporate the varied thickness of the deck panel 30, and be adjusted to different widths and describe different outline curvatures as well.

To incorporate changes in length, molded nose 82 and tail blocks 92 may be designed so that they slide fore and aft on a protruding bolt 14, with the position secured by tightening a knurled nut (not shown). In this example, the nose and tail components (82, 92) are shown with optional exterior edge or rail pieces designed to rotate on a hinged pin so as to accommodate the changing outline shape of the perimeter rail 70 as they slide fore and aft. The rocker curvature of the nose 82 and tail 92 components (which continues the bottom curvature of the rocker panel 50) of the shape-defining mold 10 may be adjusted when the nose 82 and tail 92 components are attached to the moveable rocker plates 52 provided at either end of the mold base 12. The rocker plates 52 may be designed to provide movement in two different directions—corresponding to both rocker and length—using a moveable threaded nut (not shown) captured in an internal channel or slideway (not shown) so as to position the nose 82 and tail 92 components to the desired rocker curvature, which may then be set by tightening a screw (not shown), for example. The rocker plates 52 may be designed so that they slide fore and aft on the mold base 12; the length may then be set by tightening an Allen screw 2 or other suitable mechanism. The edges of the various sub-parts may be very finely tapered to reduce the ridge or gap between the separate individual surfaces so as to minimize any transfer or print-through of minor mold imperfections to the surface of the board in the molding process. This may be accomplished all or in part with a second female mold 20 (not shown in this view) made from molded silicone rubber, for example, or an optional flexible rubber fairing 62, which is depicted in this example running the length of both panels 30 and 50, but can be utilized between any two moveable sub-parts of a shape-defining mold 10 constructed according to the general principles of the present invention.

Figure 3A:
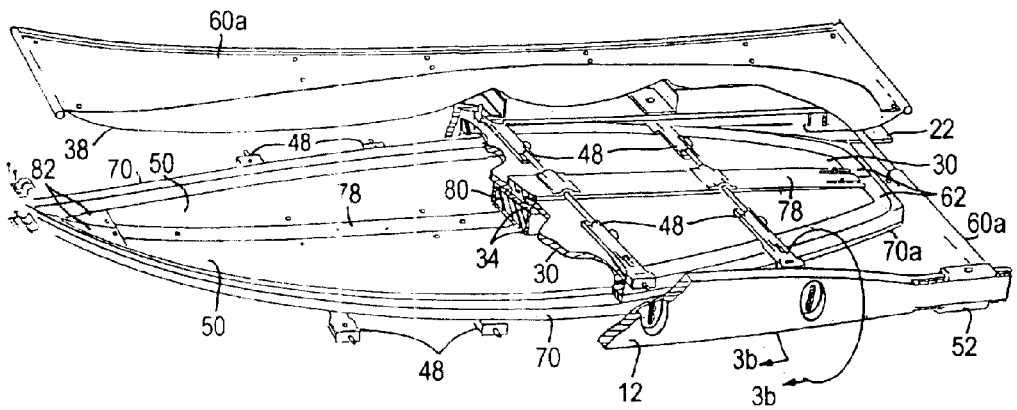
FIG. 3A is a perspective, cutaway view of the subparts assembled to create a female mold divided into top and bottom halves.

In FIG. 3A, the transverse stiffeners 48 are depicted in a horizontal position, which allows the creation of a female mold divided into top and bottom halves. In the example shown, the deck and rocker panels (30, 50) attach to a center joining flange 78, the sliding rods 24 run through the center joining flange 78, and the base of the transverse stiffeners 48 attach to a mold base 12, external frame 22, or an equivalent external reference or positioning structure. The external positioning devices may also be divided into upper and lower parts (not depicted) to facilitate setting the lengthwise curvatures of the deck and rocker panels (30, 50); the rocker curvature may also be set using a template (not shown) or, as illustrated, by using an interior spar/shear web 80 and spacers (not shown) corresponding to the thickness of the eventual skin structure. Bottom channels, bottom concaves, etc. may be produced by temporarily positioning or affixing a subpart in the form of a molded rubber or synthetic plastic foam "blanket" having the desired features (not shown, but similar to the male spacer 34 shown in FIG. 1B) to the female surface of the rocker panel 50 prior to molding.

Figure 3B:
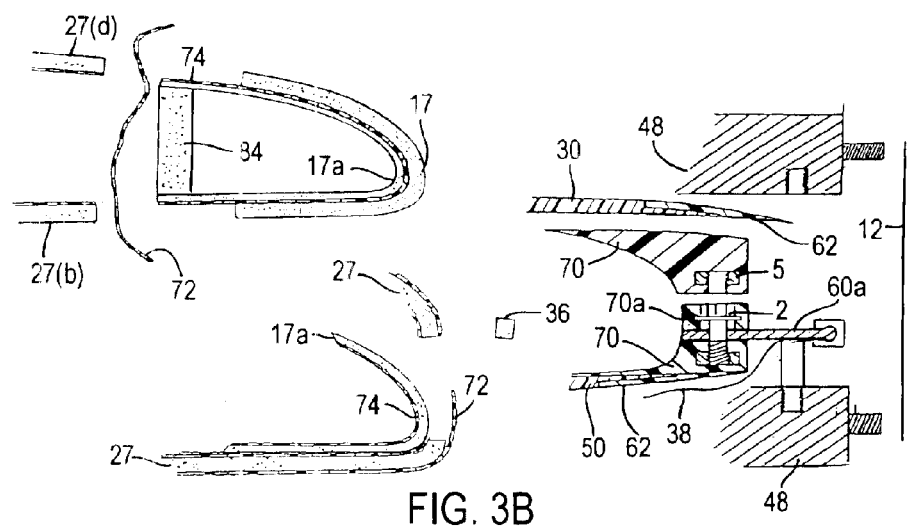
FIG. 3B is a cross-sectional view taken along lines 3b—3b of FIG. 3A.

The perimeter rail may be set by a variety of devices, including a template 60a which may incorporate a layer of material 38 that can be attached to the exterior (male surface) of the deck or rocker panels (30, 50) which, by creating an airtight barrier, permits air to be evacuated from the female surface of the mold in a vacuum thermoforming process. To accommodate thickness changes, the perimeter rail 70 may be one-piece and its curvature may enclose a smaller area (not shown); the rail 70 may also be divided into upper and lower parts at the point of greatest breadth and be provided with the rail spacer 70a, which is shown in greater detail in FIG. 3B. Skin material, such as a skin core 27 of high-density thermoplastic foam, can then be molded oversize and then trimmed to shape using the longitudinal profile (and a marking device with a suitable extension) of the pre-fabricated spar 80. In the thermoforming procedure, a double thickness, pre-formed backup rail piece 17a may be created; after the spacer 70a is removed, the skin core 27 may be evenly cut to match the edge of the perimeter rail 70. The trimmed foam 36 may then be temporarily reattached and, with the additional rail piece 17a pinned to the bottom skin core and acting as support, the deck skin core 27(d) may be brought down over the bottom skin core 27(b); the trimmed rail piece 36 may then be pinned through so it attaches to the deck skin so as to accurately mark the position where the two sides will subsequently meet. Prior to applying the laminate, the trimmed foam 36 piece(s) may be taped and temporarily reattached and serve to mold a curved shape into the laminate at the perimeter rail, which may be razor-trimmed after the laminate gels and has taken an initial set to create an overlapping, interlocking rail configuration as shown; the perimeter rail piece 17a may have laminate 72 applied and provide a source of outward pressure as the two halves are joined with the exterior surface of the pre-formed rail 17a providing a convex bonding/reinforcing flange 74 for an extremely strong, lightweight, double sandwich rail.

Much quicker production and higher overall strength can be had using a backup surface of impermeable resilient foam 40r, shown in FIG. 1B) or two pre-formed skin core layers to form a double thickness rail 17d (described in greater detail below); either of which can be used to create a convex bonding/reinforcing flange 74 to serve as a very high-strength joint due to the internal reinforcement between the board's opposing sides. Resilient foam 40r, molded in the general shape of the rail (but slightly oversized), may be bonded with the pre-molded, backup perimeter rail piece 17a and to the bottom skin core 27(b); the resilient foam rail piece may then be peeled back to insert uncured laminate layer(s) 72, reinforcing the interior of the joint at the perimeter rail. Using the same principles, the double thickness rail piece 17d, if molded oversize, may be inserted between the skin core layers 27(b,d) and, with the sandwich structure incomplete and still easy to bend, compressed (e.g., by the deck 30 and rocker panels 50 in the example shown FIG. 3A) to the thickness of the longitudinal spar 80, with the cure of composite layer(s) 72 completing the interior of the sandwich structure and creating a high-strength bonding/reinforcing flange 74 joining the two opposing sides, with each of the above surfaces (i.e., 17a, 17d or 40r) providing useful outward pressure in the bonding process. In addition, the rail or perimeter edge area can be very neatly trimmed so that clear or tinted resins can be used in the laminate for a variety of color combinations and a more attractive overall appearance.

Together, the configurations of the shape-defining mold 10 outlined above can accommodate nearly all the common modifications required within a particular style of board. Certain design modifications, however, such as bottom channels, nose concaves etc., may introduce sufficient compound curvature into the affected subpart to reduce its capacity to bend, and thereby limit its future use. The above design features may therefore be more economically accommodated by creating a one-off mold out of plastic foam, using the internal cavity of the female component 20 depicted in FIG. 1B or 2A, for example, to produce a foam blank that, upon removal, may have the desired design modifications shaped into the foam by hand; the foam blank may then be used as a male mold or form to define the shape of the exterior skin of the board in the same manner as a male configured shape-defining mold 10 of the present invention.

In the molding of the foam, the female cavity of a shape-defining mold 10 may also be used; both molds (10/20) may be used in conjunction with each other or separately; the female mold 20, when made of thermoplastic material, may also become part of the finished board. The molded foam may comprise a two-part polyurethane formulation known in the prior custom board-making arts; common procedures in the molding of which include heating the mold and pre-foam to a uniform temperature; for easier removal the foam may be allowed to rise parallel to the mold's width. The production process may be designed from the outset to create a foam shape-defining mold 10 which becomes part of the finished board; modifications may also be made to the female cavity of a shape-defining mold 10 to allow the molding of bead foams (e.g. EPS, EPP, etc.) expanded by exposure to steam, and for the foam to be molded in a shape-defining mold 10 having a modifiable internal cavity.

Figure 3C:
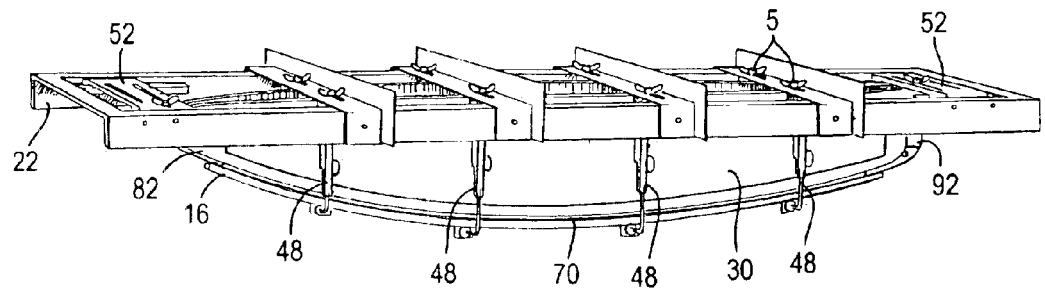
FIG. 3C is a view of the left-hand side of a shape-defining mold in a female configuration.

In the present invention, a right- and left-hand shape-defining mold 10 having a modifiable internal (female) cavity may be created simply by reversing the base of the transverse stiffeners 48 to an upright position and, as depicted in FIG. 3C, attaching the transverse stiffeners 48 to the exterior of the deck 30 and rocker panel 50, to the underside of the frame 22, and to the externally positioned fiberglass rod 16 on the exterior of the perimeter rail 70.

Figure 4A:
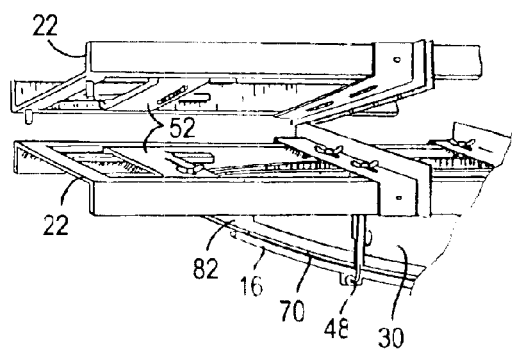
FIG. 4A depicts a frame design that facilitates matching opposite sides.

To ensure an accurate match between the opposing sides, the frame 22 may be designed as shown in FIG. 4A, so that both sides of the frame 22 fit precisely together; the base of the transverse stiffeners 48 may also be fitted with washers 8a having locating pin(s) designed to fit into matching aperture(s) on the base of the transverse stiffener 48 on the opposite side (described in greater detail below). The transverse stiffeners can be attached to a frame 22 to provide a jig fixture or "rocker table" such as the example depicted in FIG. 4B. The rocker table 18 may be designed to hold the template a 60, a longitudinal spar 80, or any of the mold subparts or shape-adjustable substrates used in the construction of the board; the rocker table 18 may also be vented and be in fluid communication with a source of vacuum pressure VP such as a vacuum pump in order to hold and mold the pieces in the fabrication process. The rocker table 18 may also be designed to replace the rocker panel 50 of a mold configured in top and bottom halves, such as the example depicted in FIG. 3A, so that male and female mold configurations can be used in the vacuum—thermoforming process. A more detailed view of the design of the transverse stiffeners 48 is depicted in FIGS. 5A, 5B, and 5C.

Figure 5A:
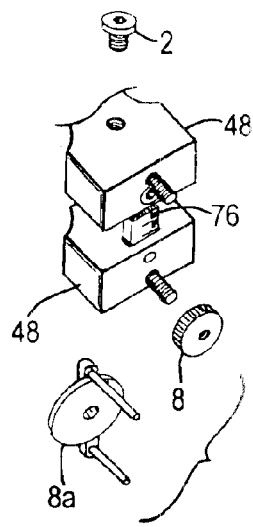
FIG. 5A is a partial view of the base area of two transverse stiffeners.

The partial view in FIG. 5A shows the base area of two transverse stiffeners 48 and depicts an Allen screw 2 that may be utilized to attach the deck 30 and rocker 50 panels, and a knurled nut 8 that, in this example, is used to attach the respective transverse stiffeners 48 to the mold base 12. The base may be provided with a measuring device 76 that also serves as an adjustment mechanism; positioning devices, such as the washer 8a may be designed with locating pins made to fit into positioning apertures in the bottom of the transverse stiffeners 48 on the opposite side (not shown).

Figure 2C:
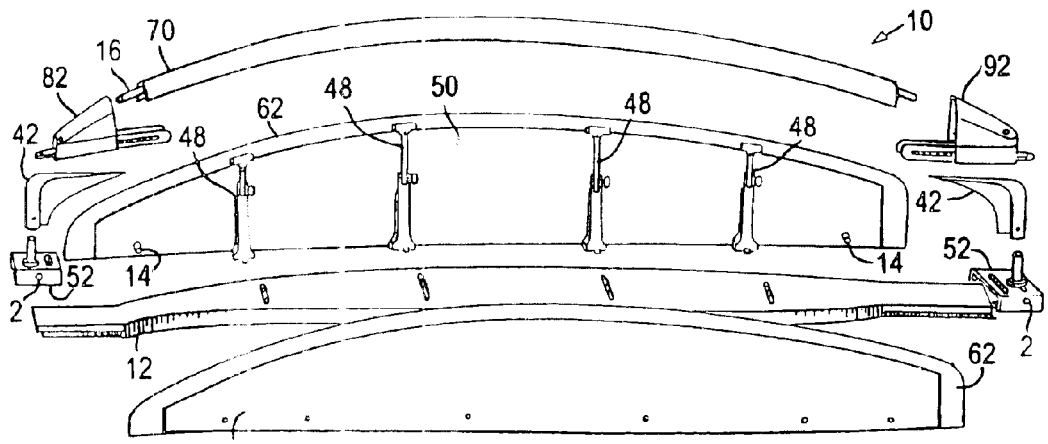
FIG. 2C is an exploded view of the right-hand mold half of FIG. 2B.
Figure 5B:
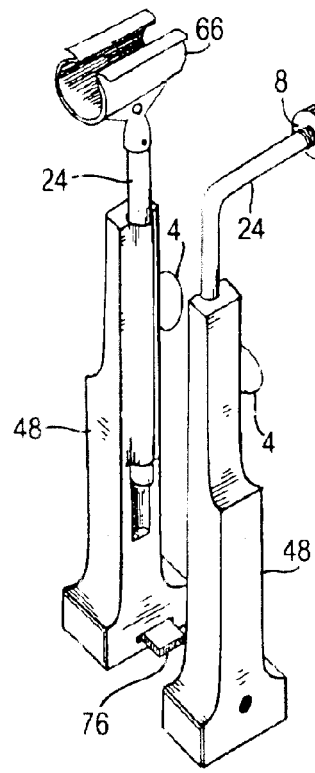
FIG. 5B is a perspective view of two transverse stiffeners in an upright position, its usual attitude in the interior of a male configured mold.

FIG. 5B shows the transverse stiffeners 48 in an upright position, corresponding to the interior position when transversely oriented to the width of a male configured shape-defining mold 10 depicted in FIG. 2C, for example, and depicts an attach point 66 designed to hold the fiberglass rod 16 on the interior of the rail 70. The adjustable rod 24 may be moved and its position set by tightening a wing screw 4; the movement of the rod 24 positions the perimeter rail 70 and modifies the board's outline and width. FIG. 5C depicts the transverse stiffeners 48 in a reversed position matching that shown in FIG. 3C—the base area is facing up for attachment to an external frame 22 and the transverse stiffeners 48 are positioned to be attached to the exterior of the deck and rocker panels (30, 50); the adjustable bars 24 are rotated so the rubber bushing 68 fits into the attach point 66; the two knurled nuts 8 tighten to the attach points on the fiberglass rod 16 on the exterior of the rail 70, and thereby allow its position to be secured. The fastening devices suggested herein are not presented in a limiting manner, but may be replaced with any number of mechanical fasteners having an equivalent function; other devices, such as spring clips, cam locks, worm gears, and similar fastening, locking and adjustment mechanisms may be deployed to perform functions not specifically described herein. In addition, fastening and adjustment devices may be added and omitted and may perform other functions, such as modifying the board's transverse deck crown, or the "vee" or "belly" in the bottom of the board. Similarly, mold materials, configurations and subparts may be combined, interchanged, and embody modifications not specifically described, or employ shape-defining parts in various areas that are made from materials that can be adapted to be used as part of the final board structure.

In the present invention, the productivity of the mold is enhanced by its capacity to produce a plurality of different shapes, and by the rapid mold-cycle of quickly formed thermoplastic sheet material; the thermoformed sheet material can function as a skin core or substrate in the finished board, or be used in the molding of foam or fiber-reinforced plastic. After use as a mold, heating the thermoplastic material to a deformation temperature will cause it to return to its original shape, which will allowing polishing, reconditioning etc. and subsequent reuse. This second inexpensive mold creation/reuse cycle is especially useful in creating small concave molds 20a for use in localized areas; further, because the female surface is conformable to the shape of the foam rather than vice-versa, very high pressure can be applied to the laminate to force excess resin from the fiber for higher strength and lighter weight. The smooth high-strength structural layers may be used to pre-mold longitudinal spar caps which can also double as internal reinforcement for bondline(s) in the board's exterior skin, or to pre-mold foam-backed structural layers that can provide internal reinforcement for areas subject to high impact (e.g., the perimeter rail, nose and tail), or in areas of severe compound curvature at the nose and tail where space is constricted and fingers, hands and application tools will not fit. The small conformable concave mold 20a may also be made from tooling composite, elastomeric rubber, etc.; the smooth surface of the structural layers, pre-molded by either component (20/20a) directly to a foam shape-defining mold 10, create the foam shape-defining structural core 40 (pictured in FIG. 1A); either or any part of which can then be used to define the shape of subsequent skin substrate layer(s), or to mold a finished thermoplastic exterior skin in a single, one-step molding process, as described in more detail below.

3. Vacuum Thermoformed Molds/Shape-Adjustable Skin Cores

In the present invention, the principles that allow the shape-defining mold to be adjusted can be applied with equal success to the board structure itself—the deck, bottom (rocker) and rail of the skin core provide shape-adjustable substrates that can be accurately trimmed, routed and/or sanded to the desired dimensions; the substrates can then be bonded to one another and receive high-strength composite skin material to produce the final, permanent shape. In either case, the substrate layer can be rapidly thermoformed high-density plastic foam, and a very thin layer of thermoformed plastic can be used as a female mold to impart a smooth surface to the board's exterior skin.

In a method of this invention, therefore, heat and pressure can be used to thermoform two chemically similar but physically different materials (i.e., sheets of pure plastic and plastic foam) to mold the board's exterior skin. The thermoforming of sheets of plastic having an acrylic, polycarbonate etc. base is widely known and used successfully to mold an array of items ranging from aircraft canopies to food containers—in the thermoforming process, a well insulated chamber such as an oven or a heated pressure vessel (e.g. an autoclave) is often used; heat can be supplied by conventional electrical heating elements, high-heat transfer fluids (e.g. propylene glycol or the like), heat blankets etc.; pressure can be provided by a two part mold press, fluid or gas filled bladders or similar molding devices. In a vacuum thermoforming process, atmospheric pressure is used; the thermoplastic sheet is usually clamped to a frame, heated to a deformation temperature, and moved into contact with the mold and, with the frame creating an airtight seal, vacuum is applied—the withdrawal of air then causes the pressure of the atmosphere to conform the thermoplastic sheet to the shape of the mold. In the present invention, vacuum may be drawn through or around the mold; the frame can also be flexible to match the specific rocker curvature of the adjustable shape-defining mold 10 or rocker table 18, for example.

Figure 6A:
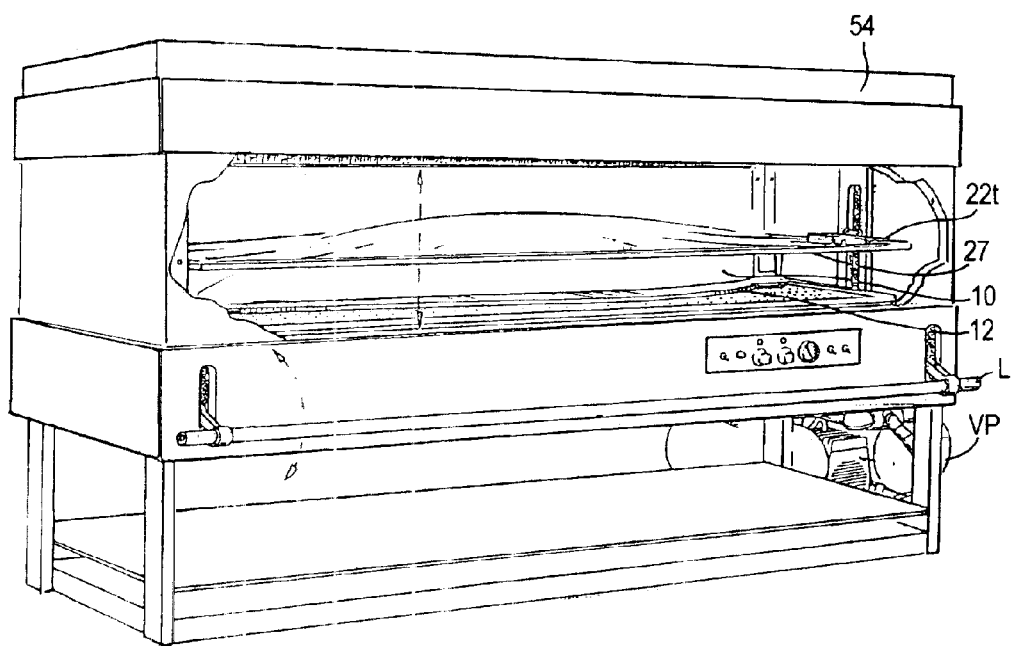
FIG. 6A is a cutaway view of an oven that can be used in the thermoforming of thermoplastic skin core material and molds.

FIG. 6A is a cutaway view of an insulated chamber such as an oven 54, and provides a non-limiting example of a thermoforming process, in which a frame 22t containing the thermoplastic sheet material is raised by a lever L into close proximity to the heating elements in the upper portion of the oven; when the thermoplastic sheet reaches a deformation temperature, the frame 22t is drawn down over the shape-defining mold 10, where it contacts the perforated platen on the bottom of the mold base 12 and makes an airtight seal; the perforated platen is in fluid communication with a vacuum pump VP to allow vacuum to be drawn; with the withdrawal of air, the pressure of the atmosphere conforms the heated thermoplastic sheet to the shape of the mold 10.

To avoid excessive stretching or (cooling) contraction of material in the thermoforming process, the thermoplastic sheet may be attached to a second layer of material that is held within the frame, rather than the frame itself; the thermoplastic sheet may also be vacuumed between layers of sheet material such as high-elongation release film or vacuum-bag material that can be held to the frame and formed for use in subsequent steps of production. Sheet silicone rubber may also by used for an airtight barrier within the frame; the thermoplastic sheet may also be held by clamps bonded to an elastomeric rubber that is then attached to the frame so that the rubber, rather than the sheet, will stretch during the forming process. This is particularly advantageous using certain types of thermoplastic sheet foam, which will conform to gradual curvature—such as the shape of the board divided into top and bottom halves—but may break or separate when attached directly to a frame because of a limited capacity to stretch during the thermoforming process.

Figure 6B:
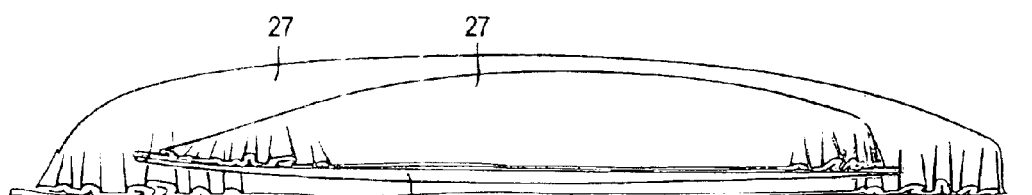
FIG. 6B shows a "longboard" and short surfboard with folds and wrinkles in the thermoformed skin core caused by excessive compound curvature of the board in right- and left-hand sides.
Figure 6C:
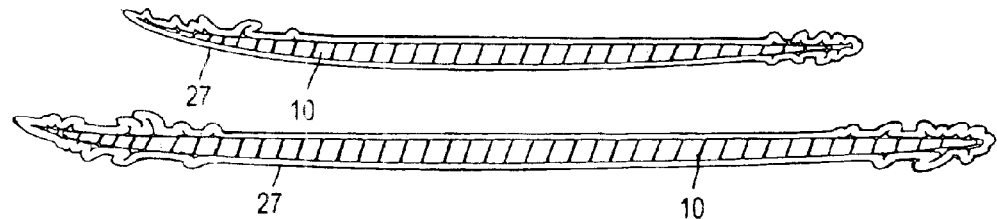
FIG. 6C is a profile view of the wrinkles in the nose area and tail areas of the two boards depicted FIG. 6B.

In the present invention, the most rapid method of production is to thermoform a layer of high-density plastic foam into a thin, continuous monocoque shell in the shape of one right- or left-hand side of the board. The difficulty molding the board in right in left halves is the excessive compound curvature around the board's perimeter edge. As can be seen in FIG. 6B (which depicts a short surfboard roughly six and a half feet long in front of a modern "longboard" 9' in length), the board's outline is as much as ten percent longer than the measurement lengthwise at the center, and the lengthwise rocker curvature increases the length differential further still. As depicted in FIG. 6B and the profile view shown in FIG. 6C, the foam's limited capacity to stretch and particularly to compress in the thermoforming process causes the thermoplastic foam skin core 27 to fold in large uncontrollable wrinkles, instead of conforming to the exaggerated compound curvature at either end.

Figure 7A:
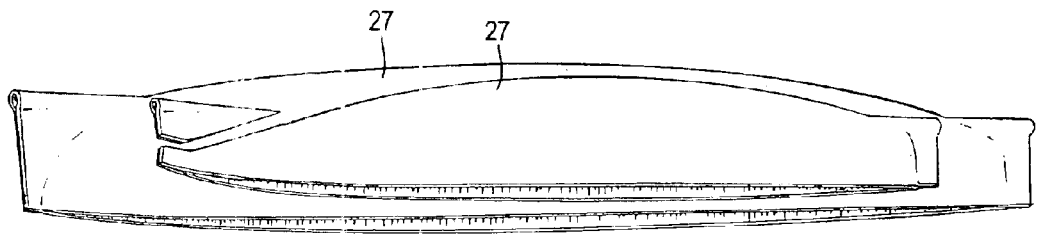
FIG. 7A is a perspective view of the boards FIG. 6B with a thermoplastic skin molded with a mold extension used to prevent the wrinkles.

In the present invention, these wrinkles are prevented by the rectangular mold extension 42 depicted in FIG. 2B; the rectangular mold extension at the nose and tail of the shape-defining mold 10 makes the outline and centerline measurements more equal, and dramatically reduces the amount of curvature at either end. As shown in FIG. 7A, the mold extension 42 allows the thermoformed skin core 27 to fold smoothly over the entire perimeter of the board in a single continuous piece—the area actually formed is the much milder compound curvature along the midsection of the board or rail.

Figure 7B:
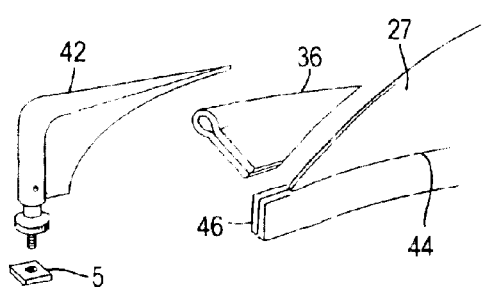
FIG. 7B is a partial view of the nose area after thermoforming a high-density foam skin core.

FIG. 7B provides a closer view of a mold extension 42 and shows a threaded nut 5, normally captured in an internal channel in the rocker plate 52 (not shown), and provides a more detailed, partial view of an example a molded foam skin core 27 removed from the shape-defining mold 10 after forming; the trimmed foam 36 shows how the foam folds smoothly over the upper portion of the extension 42, makes the sharp bend at the mold's perimeter rail 70, then conforms to the top and bottom surfaces of the mold. As depicted, the molded skin core 27 ends slightly beyond the eventual centerline 44 of the board.

After forming, the folded foam area 36 may be removed with a razor, sanding will fair in the surface and will restore the board's sharp trailing edge contours at the tail (which are usually reduced or removed in the thermoforming process). In the present example a small tab 46 is depicted; the tab is created during the trimming of the molded skin core 27 to allow the sides of the skin core to be spread so as to avoid contact with saturated reinforcing fabric in the laminating step is (described in greater detail below); it also allows changes to be made in the rocker curvature of the board and provides an area that can be clamped so that the two sides of the molded skin core 27 are bonded together again during lamination.

Figure 7C:
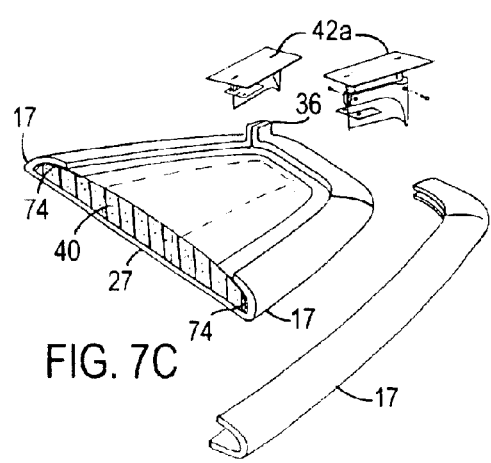
FIG. 7C is a cutaway view depicting smaller mold extensions used in the tail area of the rail.

Alternatively, the skin core 27 may be molded as depicted in FIG. 7C, which depicts a much smaller mold extension that will prevent wrinkling at either corner of the tail area when the thermoplastic skin is molded around the bottom of a shape-defining structural core 40 creating a pre-formed perimeter rail 17 having a division between the board's top and bottom sides, with an additional extension (not shown) at the nose creating molded right and left sides. As illustrated, the mold extension 42a is designed to be inserted directly into a foam core and is two-part; the flat upper area may be attached to a rocker table (18, not depicted in this view) and provides additional stability for the shape-defining structural core 40 (or foam mold 10, not shown) as the deck rests on nesting material (not shown) on a rocker table 18 (not shown in this view) during the thermoforming process. The foam in the shape-defining structural core 40 may be pre-scored with appropriate knife cuts so as to allow removal and reinsertion for bonding, application of laminate or creating internal bonding/reinforcing flanges etc., in subsequent steps of production.

Figure 4B:
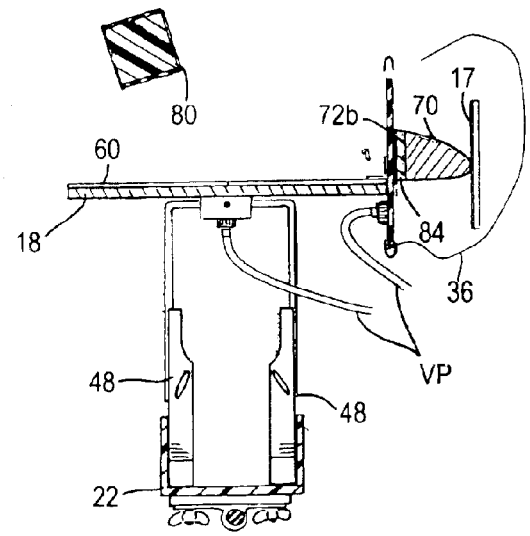
FIG. 4B is a view, partially in cross-section, of a jig-fixture or "rocker table;"
Figure 5C:
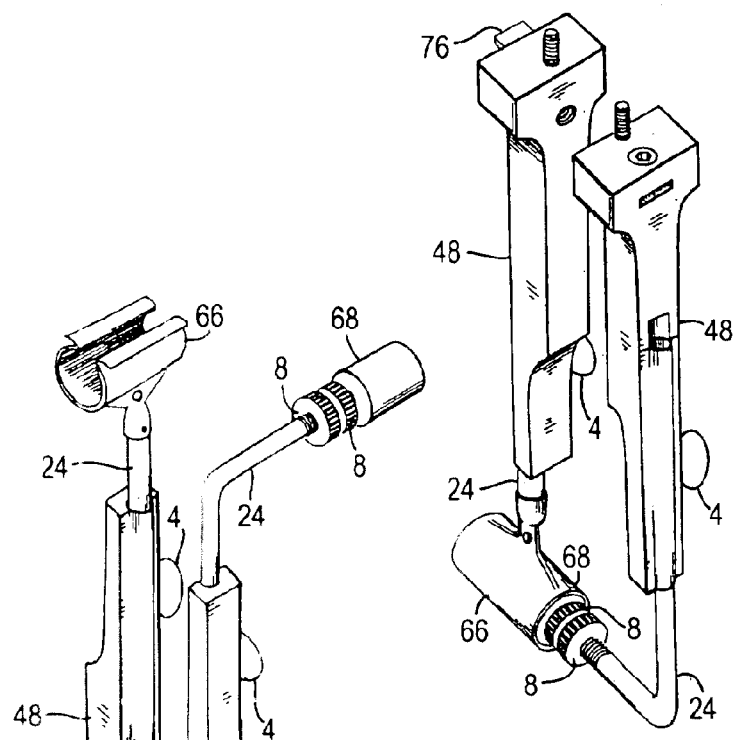
FIG. 5C is a perspective view of two transverse stiffeners in the reversed orientation used to create a female mold in right and left halves.

The perimeter rail 17 of the board is also shown molded separately—the pre-molding step can be done on a shape-defining mold 10 or by using the separate, flexible rail subpart 70 with a jig-fixture or rocker table such as that shown in FIG. 4B. When constructed from foam, resilient foam, silicone rubber etc. the rail mold 70 can be placed on a tooling composite rail base 70b; a pre-cured composite layer 72 having the desired rocker curvature already traced on it (using the template 60) can then be positioned on the rail base 70b so as to allow the perimeter rail 70 to be matched to rocker curvature; the rail 70 and thermoplastic layers can then be covered with a heat blanket and heated to a deformation temperature; as the vacuum is drawn, the flexibility of the pre-cured composite layer 72 will allow the assembly to be conformed to the outline curvature of the template 60 (shown in perspective in FIG. 1B) at the tail, so that after cooling, the thermoformed rail 17 will have the desired lengthwise rocker curvature and outline shape.

Figure 8A:
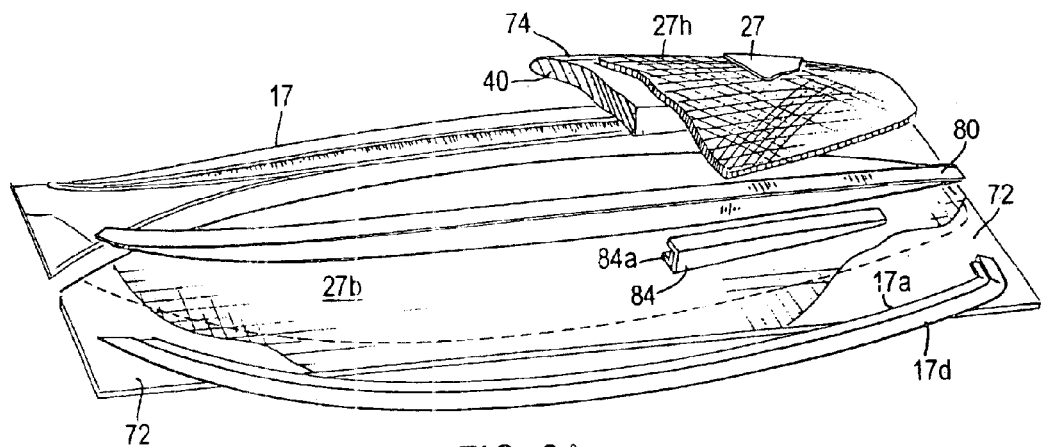
FIG. 8A is a perspective view of high-strength, shape-adjustable skin substrates that can be fabricated using convex shape-defining surfaces that become part of the board structure itself.

Referring now to FIG. 8A, pre-formed thermoplastic rail 17 can be joined to sheet core material (27b,27h) and a shape-defining foam core 40 or, using the same process outlined above, made with a second layer of high-density plastic foam 17a to create a double thickness rail 17d, which can then be combined with partially prefabricated sheet core material—i.e., core material (27b, 27h) that has an (interior)

layer of composite laminate 72 already applied and cured to one side-with only half the sandwich structure complete, the core material can still be easily bent in the direction of the side lacking the cured, high-strength composite facing, and can be bonded to the lengthwise deck and rocker curvatures of a longitudinal shear web 84 and spar 80 or a shape-defining foam mold/structural core 40; the pre-formed rail 17/17d can also serve as a template to cut the outline curvature in the board's deck 27h and bottom panels 27b before bonding to the material of the interior core. As shown, the longitudinal shear webs 84 may be thermoformed to the longitudinal profile of the spar 80 to create an adjustable, channeled foam base area and a two-part interlocking structure (84/84a); glue may be applied to both surfaces and then pinned to adjust the deck crown or thickness towards the perimeter of the board. The double thickness rail 17d, with high-strength structural layer(s) 74 applied to at least the convex surface of the interior layer 17a, can then be inserted between the deck and rocker panels to provide the perimeter edge, with high-strength facing material completing the structural exterior skin.

Because it occupies a very small area of the board, the pre-molded rail can be of very high density core material for improved impact strength around the board's perimeter edge, and can then be combined with core materials having a higher strength-to-weight ratio—e.g., end-grain balsa or Nomex® honeycomb core—which will generally not conform to the very sharp contours along the board's trailing edge and tail. For example, end-grain balsa 27b can be used for the board's flat bottom; more conformable honeycomb core 27h can be used on the less exposed area of the deck (the cells of the honeycomb core can rupture); the cells may also be protected by additional layer(s) such as wood veneer or, as shown, very thin layers of high-density plastic foam 27 etc.

Figure 8B:
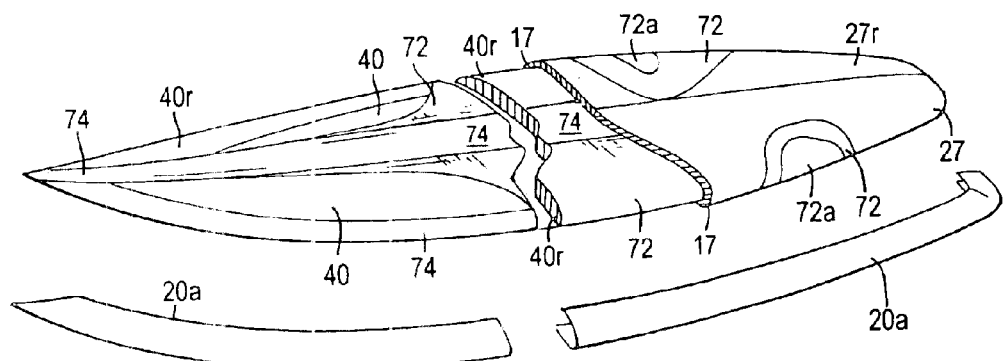
FIG. 8B is a view of a convex shape-defining structural core with high-strength structural layers providing convex bonding/reinforcing flanges.

Referring now to the composite view of FIG. 8B, the small, conformable female component 20a may be used to mold structural composite layers 74 to create a foam shape-defining structural core 40; the structural layers 74 can provide internal reinforcement in high-impact areas at the perimeter rail 74, and can also serve as bonding/reinforcing flanges 74 between the board's two opposing sides. Because the bonding/reinforcing flange 74 shown in the center of the board will eventually be hidden beneath the skin, it can function as a spar cap whose width and depth can to be increased with multiple layers molded towards the center of the board to allow the board to withstand much higher bending loads without damage; as depicted, layers 72 may also be continued around the perimeter for higher shear strength in bending. The concave conformable female components 20/20a allow high squeegee pressure to pass through to the laminate for higher strength and lighter weight—the very high strength that can be developed in the spar then allows resilient foam 40r to be used in the board's structural skin or interior core; the resilient foam 40r may also be used in combination with lighter, thicker skin materials, such as thermoformed plastic sheets 72a of ABS, PMMA, PC etc., or plastic-based fiber 72a, to better absorb high-impact and bending loads without damage.

With the internal reinforcement of the foam-backed structural layers 74, the placement of the bondline can be according manufacturing considerations or the performance requirements of the rider—thinner, high-performance surfboards, for example, often require the complete support of a solid interior foam core, but for lighter weight may require the elimination of interior layers on the bottom of the board. In the forward portion of the structural core 40, the foam-backed structural layers 74 are used for a bonding/reinforcing flange 74 at the perimeter rail so as to allow very thin high-density skin core layer(s) 27 to be molded to the board in top and bottom halves.

Figure 9A:
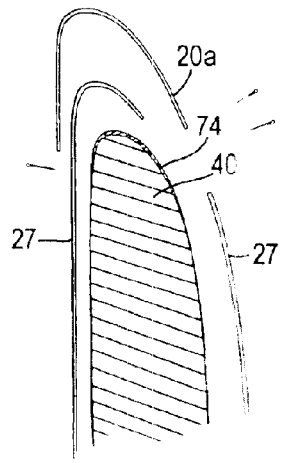
FIG. 9A depicts internal reinforcing layers serving as a bonding/reinforcing flange for high-impact areas at the board's perimeter.

FIG. 9A, provides a more detailed view of the convex surface of the foam shape-defining structural core 40 and the internal bonding/reinforcing flange 74 that allows the board's upper and lower skin halves to be joined at the perimeter—the added strength of the smoothly molded, foam-backed structural layers 74 allows the thermoformed skin core 27 to be molded to the sharpest curvature along the length of the perimeter rail, and then protects the interior foam core 40 from damage so that skin core 27 can be neatly razor-trimmed, or sanded or routed to an oblique angle, which then allows the deck skin core layer to be formed, trimmed, and high-strength facing material applied.

Figure 9B:
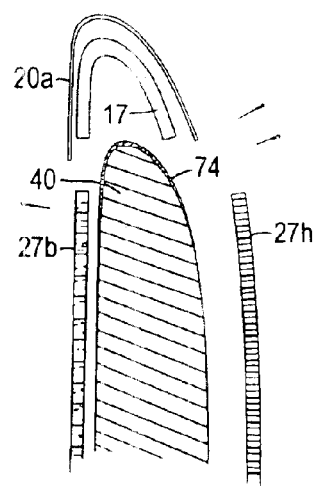
FIG. 9B depicts the assembly of skin core materials on a convex mold.
Figure 9C:
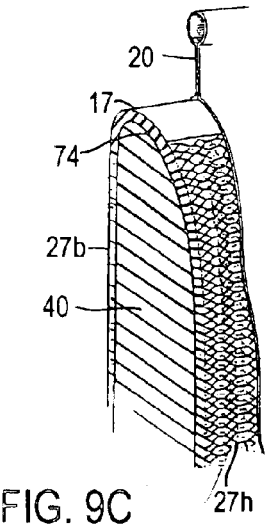
FIG. 9C depicts assembled skin core materials on a convex mold.

The thermoplastic rail mold 20a can also be used to protect and support the perimeter of the board, so that fabrication can proceed with the board's width at right angles to the worktable. As shown FIG. 9B and FIG. 9C, the upright position allows full access to the top and bottom sides of the board and provides a very stable surface for accurate trimming and assembly—the foam mold 40 will allow the thermoformed rail 17 to be pinned to the mold; a line can then be scribed for the positioning and trimming of the end-grain balsa skin core 27b or the honeycomb skin core 27h and, with the thermoformed mold 20a also aiding in the positioning and acting as a guide, the core materials 17/27(b,h) can be trimmed and glued together, so that the pre-formed perimeter rail 17 connects the broad, generally planar top and bottom surfaces of the board. After the glue has set, the single continuous surface around the perimeter of the board allows the laminate to be applied with the width of the board at right angles to the worktable, as discussed more detail below.

The mold's convex configuration and upright, accessible surface is ideally suited for expensive thermosetting honeycomb core/prepreg skin combinations, but can be better used to eliminate the pre-preg material entirely since, when the laminate is applied, the downward flow of resin will collect in a small meniscus and create a perfect bond at the outermost edges of the walls of the individual honeycomb cells; this eliminates the need for expensive bonding films etc., the high-temperature/pressure autoclave cure, and much of the prohibitively high costs of using an "advanced composite" according to the prior art, while still preserving the very high strength-to-weight ratio of the honeycomb core material itself.

4. Application of Laminate and Completion of the Board

In the present invention, the laminate is preferably applied with the width of the board oriented at right angles to the worktable—this allows gravity to provide a very effective aid in removing excess resin, but makes the initial saturation difficult because the resin will run off the vertical surface more quickly than the cloth can be saturated. This drawback may be turned to advantage, however, because it makes it possible to use a mechanical fabric impregnator to quickly pre-saturate the fiberglass cloth, and allows the laminating step to be done in rapid, assembly-line fashion—with the perimeter rail exposed, the reinforcing fabric can be quickly pre-saturated and draped over the convex surface; excess resin is then easily removed for higher strength and lighter weight; the fiber can be aligned and wrinkles removed simply by tugging the fabric taught, then trimmed to create a double overlapping joint on either side of the midsection of the rail and the very sharp convex curvature at the nose and tail. The mold's convex surface also functions as a tool that allows the composite reinforcement to be applied to the interior surface of the pre-molded rail 17 in areas prone to high-impact (e.g., in the nose and tail areas where fingers, hands, and application tools would not otherwise fit) as the thermoformed skin core 27 is placed on top.

Figure 10A:
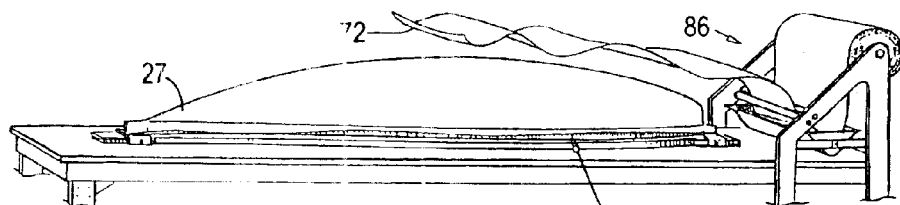
FIG. 10A depicts a board being laminated on a convex mold.

FIG. 10A is a perspective view of the laminating step showing the reinforcing fabric being run through the fabric impregnator 86 and the laminate 72 being drawn up into place to be trimmed on the surface of the mold 10 and pre-molded skin core 27. In the laminating step, the convex surface of the shape-defining mold 10 may be coated with a release film, followed by a first layer of laminate; the pre-molded foam skin core 27 is then placed on top, creating the inside layer of a sandwich skin, followed by the additional layer(s) of laminate that form the exterior of the structural sandwich skin; the optional female component 20 then completes the assembly—squeegee pressure can then pass directly through to the exterior layer(s) of laminate 72 while gravity removes the rest—unobstructed, the resin quickly runs off the vertical sides of the shell and leaves an absolute minimum within the fiber.

In the present invention, the items being laminated are lightweight and moveable; a series of boards can be laminated in rapid succession, with the fabric being run continuously through the fabric impregnator 86 while the resin remains liquid in the bath. To prevent premature hardening, the gel time of the resin may be extended, preferably to about an hour; in the present invention, the penalty of the longer cure/mold-cycle is largely removed because the area required during cure is minimal—the board may be positioned so its thickness, rather than its width, occupies shop space during cure—and the cure time of the multiple boards that can be laminated in a single run will be an average of the gel time of the resin, or roughly half an hour using the above example.

Figure 10B:
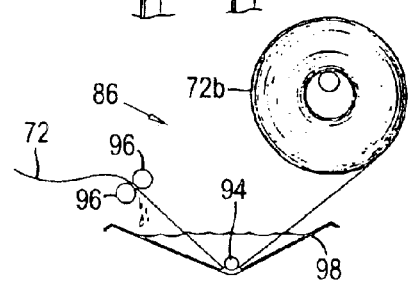
FIG. 10B is a side view of a fabric impregnator.

A profile view of a fabric impregnator 86 is provided in FIG. 10B—the bolt of reinforcing fabric 72b is depicted directly above the resin bath 98; the reinforcing fabric is unrolled from the bolt, immediately saturated as it is submerged and drawn around a roller 94 in the resin bath 98, it then runs between two nip rollers 96 so that the excess resin is removed and the correct amount is left in the laminate 72.

The complete mechanical saturation makes it possible to replace the easily saturated, loosely woven boat or tooling fabrics commonly used in the prior art with the difficult to saturate, tightly woven, high-strength satin or crowfoot fiberglass fabrics—ordinarily used in thermosetting pre-pregs—which have resin requirements of only thirty-five percent by weight for complete saturation. Useful examples, using weave numbers shared by the various manufacturers of fiberglass reinforcing fabrics (e.g. Hexcel, Burlington, etc.), include #7781, an eight-harness satin weave weighing 8.71 oz. per square yard, and #120 crowfoot weave weighing 3.70 oz./yd. The very fine weave of the satin reinforcing fabric leaves a smoother surface and, because overlaps in the fabric can be hidden beneath the skin core, eliminates much of the labor required to bring the surface of the board to a cosmetic finish. In the present invention, a female surface is a non-essential item in production; a very thin plastic film can be used to produce a smooth surface in the board's exterior skin.

After the resin gels and has taken an initial set, the laminated skin core 27 may be razor trimmed and excess foam/laminate material removed to create the longitudinal centerline 44 of the board; the razor will leave a sharp straight edge suitable for subsequent joining, and with practice is easily be accomplished by hand, although a strip of aluminum or similar material can be pinned to the laminated shell 27 to act as a straightedge and guide. Bonding of the exterior skin to the interior core then completes the basic board structure.

Figure 11A:
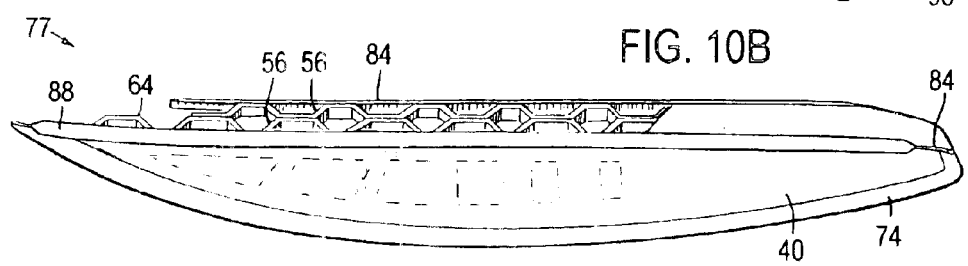
FIG. 11A is a perspective view of various shape-defining surfaces of a convex shape-defining structural core.

FIG. 11A provides an illustration of various shape-defining surfaces comprising a convex shape-defining structural core 77. The view includes a longitudinal shear web/supporting strut 84 and spar cap 88 material; also shown is a bonding/reinforcing flange 74 molded around the perimeter edge; both may be molded to the foam shape-defining structural core 40 using female molds 20/20a of the present invention; the interior core may also include transverse ribs, shear webs, bulkheads, or supporting struts etc. (not shown). The foam areas in the interior may be bead foams (e.g. EPS, EPP) which are molded by a female shape-defining mold 10, (not shown in this view) and then provide a convex shape-defining surface 40 for the board's structural exterior skin. Any of the synthetic foams (e.g. polyurethane, polyethylene, EPS, EPP, polystyrene, polypropylene etc.), where appropriate, may be molded, shaped, or cut, using known die cutting, wire-cutting, milling, and shaping techniques, which may be numerically controlled (CNC) where applicable, to form shape-defining foam 10 (as shown in FIG. 1A, for example) or a shape-defining structural core 40. After use as a shape-defining surface 10/40, the above foams may be made lighter by removing additional material (along the dashed lines) by die cutting, routing, wire-cutting etc. to create a partially hollow, chambered foam core. The honeycomb foam core material 64 depicted may be created from sheets of foam heated to forming temperature and then thermoformed into the initial half-hexagonal/half-cellular configuration, the material may be cut into strips 56 and then joined together to form a cellular foam-honeycomb core 64.

Alternatively, foam may be molded directly to the interior cavity of a pre-molded, laminated skin core 27. For example, pre-expanded foam beads may be coated with a suitable binder and then deposited into the interior of the laminated skin core 27, and then partially compressed during cure of the binder by the insertion of a third member—either specially designed for the purpose—or by use of an interior member such as a shear web 84 that becomes part of the finished structure. For expanded bead foams, the molding process can be aided by a source of positive or negative air pressure—this may be provided in the interior by a vented tube or pipe placed along the inside of the perimeter rail, which may be later removed, or by perforating and venting a box-beam, shear web, interior bulkhead etc. and providing fluid communication with a source of air pressure or steam which, depending on configuration, may vented through apertures designed to accept plugs for leashes, footstraps, fin-boxes, mast-tracks or the like.

Figure 11B:
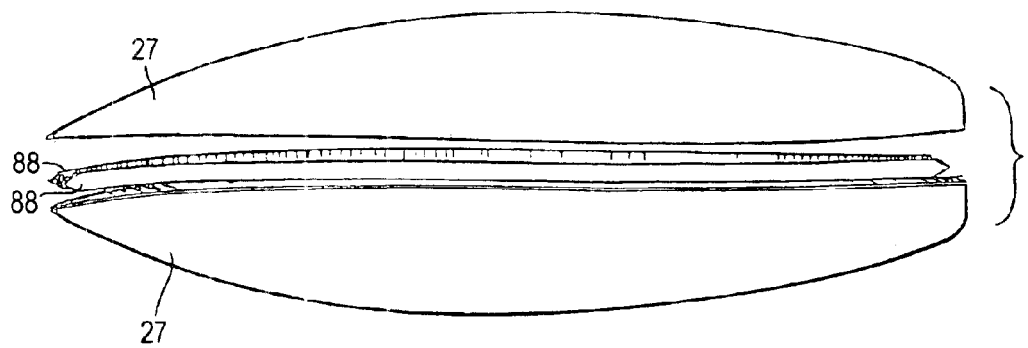
FIG. 11B depicts two halves being bonded to a bonding/reinforcing flange.

Fins, boxes for same, mast-tracks, plugs for foot-straps, leashes etc. appropriate for the end use of the board may be attached using conventional methods; access to the interior prior to the introduction of the interior core allows a backup structure to be added concurrent with the bonding. In FIG. 11B, the two halves 27 of the board are shown before being joined, during which time a longitudinal spar may be created using pre-cured plastic composite strips 88 that serve as joining flanges in the bonding procedure, and as longitudinal reinforcing flanges or spar caps in the finished structure.

Figure 12A:
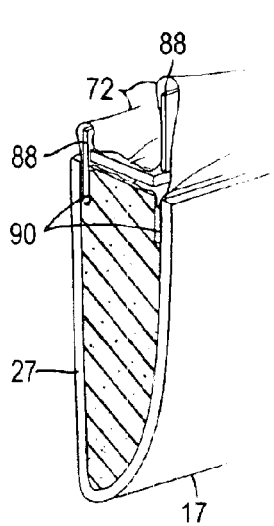
FIG. 12A is a closer, cross-sectional view of FIG. 11B.
Figure 12B:
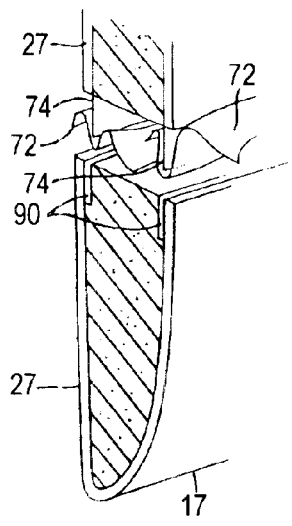
FIG. 12B is a closer, cross-sectional view of a bonding procedure using a convex bonding/reinforcing flange integrally molded to the skin core.
Figure 12C:
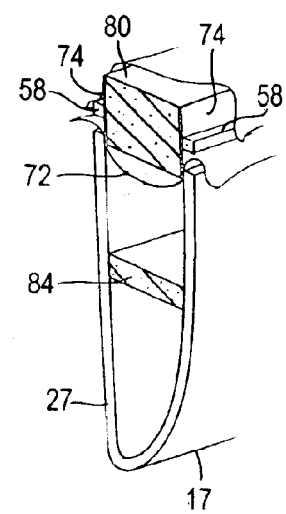
FIG. 12C is a closer, cross-sectional view of a bonding procedure where the convex bonding/reinforcing flange is integrally molded to a box-beam spar.

FIGS. 12A, 12B, and 12C provide cross-sectional views of bonding the right and left-hand sides of the board together—in FIGS. 12A and 12B, a knife or other appropriate tool (not shown) has been inserted between the molded sandwich skin core 27 and the foam 40 of the interior core; sufficient foam has been removed to create a slot 90 for the pre-cured composite top and bottom spar caps/joining flanges 88/74, which preferably incorporate high-strength unidirectional S-glass, Kevlar®, carbon fiber etc. running lengthwise, in a high-strength, high-temperature curing epoxy fiber-resin. The spar caps/joining flanges 88/74 provide convex surfaces that can be wrapped with fiberglass 72 saturated with the bonding resin; the spar caps/joining flanges 88/74 are then tucked into the top and bottom slots 90, and the excess fiberglass 72 that comes out of each slot 90 provides the structural wall for the foam core of the shear web 84; the two halves are bonded together—completing the joining flange, which serves as a longitudinal reinforcing flange on the upper "shortboard" 28s shown in FIG. 14. The convex shape-defining mold 10 allows the bonding/reinforcing flange 74 to be molded integrally with the skin, as shown in FIG. 12B. FIG. 12C depicts the same general bonding procedure where a box-beam spar 80 provides the bonding/reinforcing flange 74 joining the board's two opposing sides. The laminating step may also be designed to create a joining flange normal to the width of the board; in addition, the shear web and/or spar structure may incorporate traditional materials such as wood.

Figure 13A:
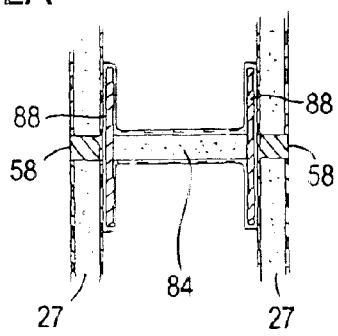
FIG. 13A is a cross-sectional view of an I-beam spar.
Figure 13B:
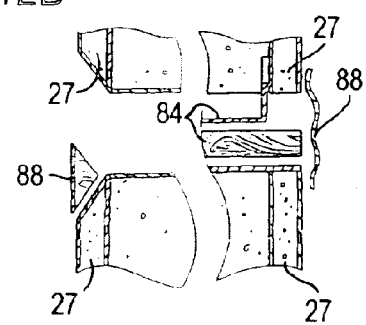
FIG. 13B is a cross-sectional view of alternate convex bonding/reinforcing flanges.

FIG. 13B provides a cross-section view of various foam backed structural layers which will provide internal reinforcement for bond-lines in the skin and create a high-strength joint between the board's right and left or top and bottom sides. The convex surface of the bonding/reinforcing flanges 74 are easily created in fiber-reinforced plastic using a thermoplastic mold 20a of the present invention; a spar cap 88 of fiber-reinforced plastic laminate may also be used on the exterior to seal the surface. FIG. 13A depicts the shear web 84 and spar caps 88 forming an I-beam; the gap 58 created by the shear web 84 in the bonding operation may comprise high-strength fiber such as Kevlar®, carbon-fiber, etc.

Figure 14:
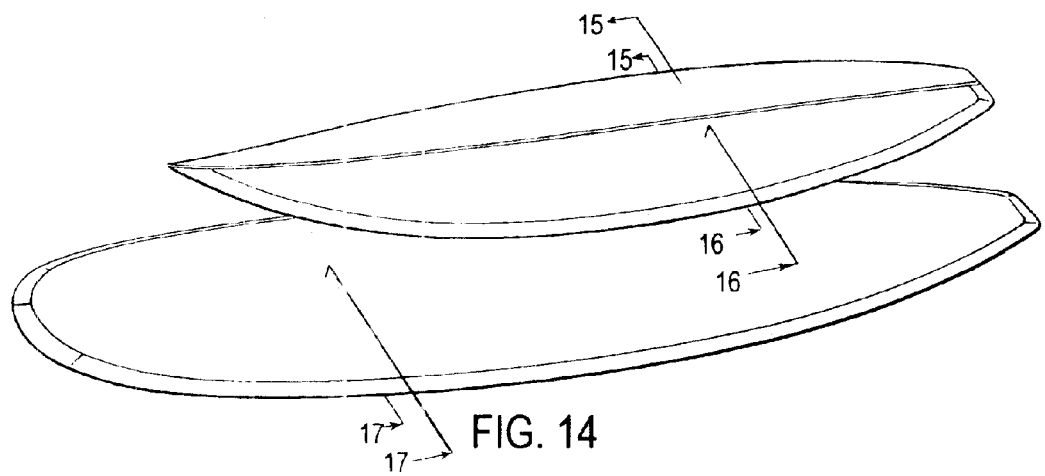
FIG. 14 depicts two finished boards.
Figure 15:
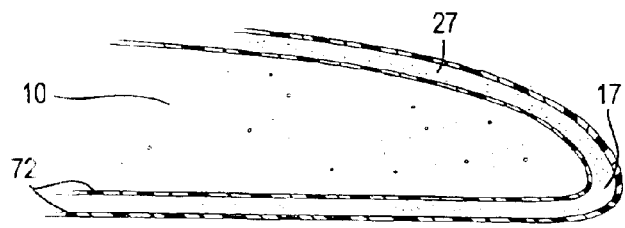
FIG. 15 is a cross-sectional view of a skin core forming a monocoque perimeter rail taken along the lines 15—15 of FIG. 14.
Figure 16:
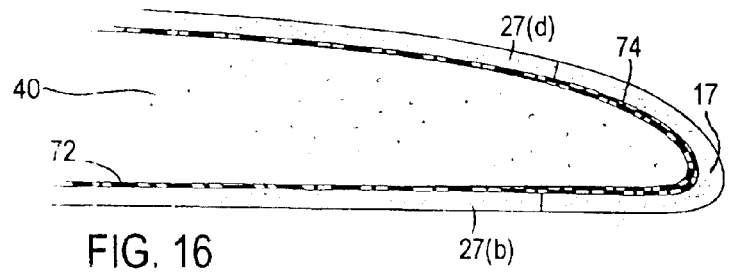
FIG. 16 is a cross-section view taken along lines 16—16 of FIG. 14.
Figure 17:
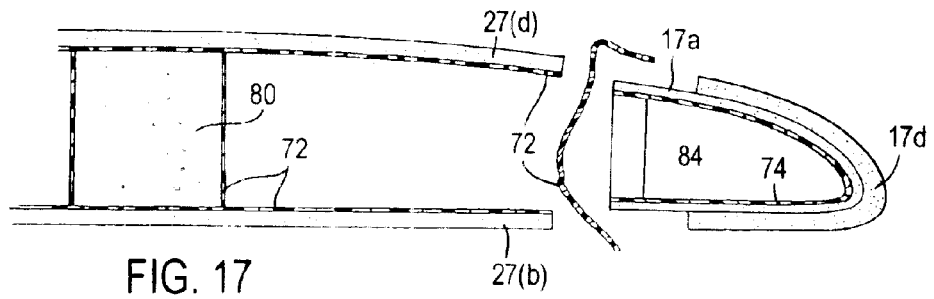
FIG. 17 is a cross-section view taken along lines 17—17 of FIG. 14.

FIG. 15 is a cross-section view showing the continuity of the skin core layer through the point of greatest breadth and area of sharpest curvature of the perimeter rail 17; the view is taken along lines 15—15 of the "shortboard" 28s depicted in FIG. 14. FIG. 16 is a cross-section taken along lines 16—16 on the opposite side of the board 28s shown in FIG. 14, and depicts a separate, premolded perimeter rail constructed according to the principles outlined in the description of FIG. 8A, with a shape-defining structural core 40 with a quickly pre-molded higher-density foam perimeter rail 17 providing very high impact resistance due to the very high-density skin core, the complete continuity of material and absence of any joint at the board's exposed perimeter. FIG. 17 is a cross-section view taken along lines 17—17 of the "longboard" depicted in FIG. 14, and depicts the top and bottom skin cores 27(d,b) bonded to a shape-defining structural core in the form of a longitudinal spar 80, with the pre-formed double thickness perimeter rail 17d completing the perimeter edge; the double layer of high-density thermoformed plastic provides an interior layer with a convex surface for structural layers 74 to be applied so that the rail 17d can function as a bonding/reinforcing flange 74 connecting the board's two opposing sides; the shear web 84 may also be made circular or C-shaped in cross-section (not shown) with a mold structure such as the rail mold 70 used to pre-form the perimeter rail; for purposes of clarity, the latter two views show the skin core without the composite facing material used to complete the board's exterior skin.

In the present invention, the thermoplastic skin core material offers a rapid mold-cycle and low overall costs of production; the scope of the invention, however, includes use of other core materials, such as over-expanded (OX-core) honeycomb, or high-density sheet foam that is scored and attached to a fiberglass scrim, or other core materials sufficiently conformable to pre-mold the perimeter rail 17, or a double thickness rail 17d with the extra leverage of the two-part convex/concave mold (10/20a) of the present invention. The scope of the invention includes single thickness materials, such as a layer thermoformed plastic, the interior side of which may be coated with high-strength composite facing material and then joined to the surface of the board or to a bonding/reinforcing flange of the present invention, with the joining of the exterior layer of thermoformed plastic to the interior layer turning the interior layer into a skin core due to its position within the skin structure. Therefore, the position of the skin layer determines whether it is a skin core layer rather than its function, and interior layers may be added or omitted depending on weight, strength, or manufacturing considerations. The present invention is therefore not limited to the specific embodiments described above; the modifications in mold and board configurations and materials, and in the order and number of manufacturing steps that might be made by those skilled in the art are included within the spirit and scope of the present invention.

I claim:

1. A board comprising:

a structural exterior skin covering the surface of the board and creating an interior, the structural exterior skin characterized as having a layer of skin core with a division at an axis of asymmetry creating molded right and left sides, with high-strength facing material covering a surface of the skin core, the structural exterior skin further characterized as being bonded to a convex bonding/reinforcing flange joining the two opposing sides, the skin core layer further characterized as having, a single continuous surface on both sides of the point of greatest breadth and through the area of sharpest curvature, thereby forming a perimeter rail connecting the broad, generally planar top and bottom surfaces of the board.

2. The board of claim 1, wherein the skin core of the perimeter rail is of greater density than the skin core layers of the top and bottom surfaces of the board.

3. The board of claim 1, wherein the skin core comprises symmetrical right and left halves, with each half having a continuous surface from an axis of symmetry through the point of greatest breadth to the axis of symmetry on the opposite side, so that the skin core forms a continuous monocoque shell.

4. The board of claim 1, wherein the structural exterior skin comprises a plurality of skin core layers arranged to create a density gradient from the outermost skin core layer inward.

5. The board of claim 1, wherein the interior is an interior chamber and further wherein the interior chamber is filled with a material selected from the group consisting of: foam, low-density foam, chambered foam, expanded foam beads, expanded bead foam, a plurality of shear webs, a plurality of skin supporting struts, and transverse bulkheads.

6. The board of claim 1, wherein the convex bonding/reinforcing flange is connected to a shear web.

7. The board of claim 6, wherein the bonding/reinforcing flange occupies a position on the board selected from the group consisting of: the longitudinal centerline, and the perimeter rail.

8. A method of producing a board comprising the steps of:
a. providing a skin core;
b. providing a convex shape-defining mold;
c. applying the skin core to the convex shape-defining mold to create a pre-formed shape-adjustable substrate having the shape of the area of sharpest curvature along the length of the board's perimeter rail;
d. utilizing steps a through c to mold opposite sides;
f. bonding the pre-formed shape-adjustable substrate to a convex bonding/reinforcing flange to join two opposing sides;
g. applying a high-strength facing material to form a structural exterior skin.

9. The method according to claim 8 wherein the convex shape-defining mold is a convex shape-defining structural core.

10. The method according to claim 8 wherein the shape-adjustable substrate comprises symmetrical right and left halves and forms a continuous shell with a division at the longitudinal centerline of the board.

11. The method according to claim 8 wherein the structural exterior skin covers an interior core comprised of material selected from the group consisting of: low-density foam, expanded bead foam, expanded foam beads, chambered foam, foam having a cellular honeycomb configuration, transverse ribs, transverse bulkheads, longitudinal shear webs, upper spar caps, lower spar caps, an upper longitudinal reinforcing flange, and a lower longitudinal reinforcing flange, and the bonding/reinforcing flange.

12. The method of claim 8 wherein the convex bonding/reinforcing flange bonds two opposing sides and the division is selected from the group consisting of: the longitudinal centerline, and the perimeter rail.

13. The method of claim 8 wherein a molded thermoplastic sheet is used to mold at least one internal skin layer.

14. The method of claim 8 wherein the high-strength facing material is a fiber-reinforced plastic, and the reinforcing fabric is saturated with a laminating resin, and the source of the laminating resin is remote, and the board is positioned so as to allow gravity to aid in removing excess resin from the reinforcing fabric.

15. The method of claim 14 wherein the reinforcing fabric is saturated with a mechanical fabric impregnator.

16. The method of claim 14 wherein a concave conformable mold surface is used to impart a smooth surface in the structural exterior skin.

17. A method of producing a board comprising the steps of:
a. providing a convex shape-defining mold;
b. providing a thermoplastic sheet;
c. heating the thermoplastic sheet to a deformation temperature;
d. applying the thermoplastic sheet to the convex shape-defining mold,
e. applying pressure to the thermoplastic sheet to form a molded thermoplastic sheet;
f. joining the molded thermoplastic sheet to a second layer of material to form a skin core;
g. utilizing steps a through f to mold opposite sides;
h. bonding two opposing sides to a convex bonding/reinforcing flange.

18. The method of claim 17 wherein the convex shape-defining mold is a convex shape-defining structural core.

19. The method of claim 17 wherein the skin core forms a perimeter rail.

20. The method of claim 17 wherein the molded thermoplastic sheet forms a skin core that comprises symmetrical right and left halves and forms a continuous shell with a division at the longitudinal centerline of the board.

21. The method of claim 17 wherein the wherein the molded thermoplastic sheet in used as a sandwich core in the skin.

22. The method of claim 17 wherein the interior core is composed of material selected from the group consisting of: low-density foam, expanded bead foam, expanded foam beads, chambered foam, foam having a cellular honeycomb configuration, transverse ribs, transverse bulkheads, longitudinal shear webs, upper spar caps, lower spar caps, an upper longitudinal reinforcing flange, and a lower longitudinal reinforcing flange, a convex bonding/reinforcing flange.

23. The method of claim 17 wherein the molded thermoplastic sheet is used to mold at least one internal layer.

24. The method of claim 17 wherein the molded thermoplastic sheet is the outermost layer in the skin.

* * * * *